(12) United States Patent
Xu et al.

(10) Patent No.: US 10,130,218 B2
(45) Date of Patent: Nov. 20, 2018

(54) AUTOMATIC SEASONING ADDING APPARATUS APPLICABLE IN FULLY AUTOMATED COOKING MACHINE

(71) Applicants: Jinbiao Xu, Guangzhou (CN); Guang He, Shenzhen (CN)

(72) Inventors: Jinbiao Xu, Guangzhou (CN); Guang He, Shenzhen (CN)

(*) Notice: Subject to any disclaimer, the term of this patent is extended or adjusted under 35 U.S.C. 154(b) by 732 days.

(21) Appl. No.: 14/429,362

(22) PCT Filed: Mar. 7, 2013

(86) PCT No.: PCT/CN2013/072311
§ 371 (c)(1),
(2) Date: Mar. 19, 2015

(87) PCT Pub. No.: WO2014/131209
PCT Pub. Date: Sep. 4, 2014

(65) Prior Publication Data
US 2015/0238051 A1    Aug. 27, 2015

(30) Foreign Application Priority Data
Feb. 28, 2013  (CN) .......................... 2013 1 0065109

(51) Int. Cl.
*A47J 47/01* (2006.01)
*A47J 37/10* (2006.01)
(Continued)

(52) U.S. Cl.
CPC .............. *A47J 47/01* (2013.01); *A47J 27/14* (2013.01); *A47J 36/34* (2013.01); *A47J 37/101* (2013.01); *A47J 37/108* (2013.01)

(58) Field of Classification Search
None
See application file for complete search history.

(56) References Cited

U.S. PATENT DOCUMENTS

| 4,503,502 A | * | 3/1985 | Chapin | A47J 27/62 |
| | | | | 700/90 |
| 4,858,468 A | * | 8/1989 | Tahara | G01F 23/00 |
| | | | | 340/618 |

(Continued)

FOREIGN PATENT DOCUMENTS

| CN | 1433730 | * | 8/2003 |
| CN | 1433730 A | | 8/2003 |

(Continued)

OTHER PUBLICATIONS

1st Office Action of counterpart Chinese Patent Application No. 201310065109.9 dated Jul. 3, 2014.

*Primary Examiner* — Ibrahime A Abraham
*Assistant Examiner* — Gyounghyun Bae

(57) ABSTRACT

An automatic seasoning adding apparatus applicable in a fully automated cooking machine comprises a machine frame (100), a wok lid (200), a hollow shaft (31), a wok lid controlling assembly (3), and a seasoning pumping assembly (40). The wok lid is provided with an opening to be fixedly connected to and in communication with the hollow shaft. The wok lid controlling assembly is provided on the machine frame and is slidingly engaged with the hollow shaft to control the wok lid to cover/uncover a wok (20). The seasoning pumping assembly comprises a plurality of peristaltic pumps (41). All the peristaltic pumps are connected to a master control device (7) to receive a command issued by the master control device on the basis of a preset recipe program, and pump, on the basis of the command, an appropriate amount of the liquid seasoning.

10 Claims, 19 Drawing Sheets

(51) Int. Cl.
*A47J 36/34* (2006.01)
*A47J 27/14* (2006.01)

(56) References Cited

U.S. PATENT DOCUMENTS

| | | | | |
|---|---|---|---|---|
| 5,088,390 | A * | 2/1992 | Wong | A47J 43/04 99/327 |
| 5,241,899 | A * | 9/1993 | Kuhlman | A21B 5/06 118/16 |
| 6,337,631 | B1 * | 1/2002 | Pai | A61M 5/1411 340/618 |
| 6,843,166 | B1 * | 1/2005 | Li | A47J 27/14 99/327 |
| 7,011,013 | B2 * | 3/2006 | Leason | A47J 36/165 99/339 |
| 7,174,830 | B1 * | 2/2007 | Dong | B25J 9/0084 901/1 |
| 7,485,830 | B2 * | 2/2009 | Wang | F24C 1/00 219/201 |
| 7,930,973 | B2 * | 4/2011 | Wong | A47J 37/108 366/144 |
| 8,066,427 | B2 * | 11/2011 | Wong | B01F 7/00208 366/276 |
| 9,730,542 | B2 * | 8/2017 | Storek | A47J 27/002 |
| 9,775,466 | B2 * | 10/2017 | Zhang | A47J 37/10 |
| 2002/0176921 | A1 * | 11/2002 | Torghele | A21C 1/06 426/549 |
| 2002/0178932 | A1 * | 12/2002 | Cai | A47J 27/04 99/516 |
| 2003/0019862 | A1 * | 1/2003 | Sherwin | A47J 36/00 219/400 |
| 2009/0297678 | A1 * | 12/2009 | Liu | A47J 43/04 426/438 |
| 2011/0117259 | A1 * | 5/2011 | Storek | A47J 36/14 426/509 |
| 2013/0037135 | A1 * | 2/2013 | Eide | A23L 2/62 137/512 |
| 2013/0216673 | A1 * | 8/2013 | Storek | A47J 27/62 426/509 |
| 2014/0199454 | A1 * | 7/2014 | Storek | A47J 36/32 426/508 |
| 2014/0373728 | A1 * | 12/2014 | Lee | A47J 37/043 99/349 |

FOREIGN PATENT DOCUMENTS

| | | |
|---|---|---|
| CN | 101522079 A | 9/2009 |
| CN | 102631130 A | 8/2012 |

* cited by examiner

AUTOMATIC SEASONING ADDING APPARATUS APPLICABLE IN FULLY AUTOMATED COOKING MACHINE

FIELD OF THE INVENTION

The invention relates to an intelligent home appliance, more particularly, to an automatic seasoning adding apparatus applicable in a fully automated cooking machine.

BACKGROUND OF THE INVENTION

Chinese cuisine has a tremendous range of flavors and styles. The basic cooking methods include stir frying, stewing, deep frying, boiling, steaming, pan frying, roasting braise, and so on. The essence of cuisine is the mixture and heating of the ingredients, thus a variety of dishes can be made by changing the ingredients and heating intensity. However, up to now, cooking involves a lot of manual labor and relies very much on the cook's experience and skills.

There exists some automated cooking machines; however, they normally cannot realize an automation process from feeding raw material to a wok till pouring the cooked food out of the wok. More particularly, existing automated cooking machines cannot automatically add seasonings into the wok. As a consequence, human intervention is still required during the cooking process, which means the automation degree of the existing cooking machines is yet to be improved. In addition, in order to add a seasoning into the wok, an operator has to lift the wok lid prior to the adding of the seasoning when using the existing cooking machines, in which case, heat loss from the wok is inevitable.

SUMMARY OF THE INVENTION

The embodiments of the present invention aim at providing an automatic seasoning adding apparatus applicable in a fully automated cooking machine. The automatic seasoning adding apparatus can precisely add a seasoning into a wok under the control of a master control device of the fully automated cooking machine and can thus realize a high degree of automation.

In order to achieve the above objective, the embodiments of the present invention provide an automatic seasoning adding apparatus applicable in a fully automated cooking machine, comprising:
  a machine frame,
  a wok lid,
  a hollow shaft,
  a wok lid controlling assembly, and
  a seasoning pumping assembly,
  wherein the wok lid is provided with an opining to be fixedly connected to and in communication with the hollow shaft, the wok lid controlling assembly is provided on the machine frame and is slidingly engaged with the hollow shaft to control the wok lid to cover/uncover a wok;
  the seasoning pumping assembly comprises a plurality of peristaltic pumps, an input end of each of the peristaltic pumps is connected via an input pipe to a packaging bottle containing a liquid seasoning, while an output end of each of the peristaltic pumps is connected with an output pipe that passes through the hollow shaft;
  all the peristaltic pumps are connected to a master control device to receive a command issued by the master control device on the basis of a preset recipe program, and pump, on the basis of the command, an appropriate amount of the liquid seasoning, the liquid seasoning sequentially passes through the input pipe, the output pipe, and then flows into the wok.

Preferably, the output pipe comprises an output hose and a guide tube, one end of the output hose is connected to the output end of the peristaltic pump, the other end of the output hose is connected to the guide tube; the guide tube is received inside the hollow shaft via a guide-tube frame.

Preferably, the packaging bottle comprises a liquid seasoning storing cavity and a liquid level indicating cavity that communicates with the liquid seasoning storing cavity, a level of the liquid seasoning in the liquid seasoning storing cavity is indicated by a floating ball in the liquid level indicating cavity.

Preferably, the input pipe is an input hose, the liquid seasoning storing cavity is provided with a delivery tube that connects to the input hose.

Preferably, a minimum level detector is arranged at a bottom of the packaging bottle and close to the liquid level indicating cavity, the minimum level detector outputs alerting signals to the master control device when it detects the floating ball has moved to a minimum level position.

Preferably, the wok lid controlling assembly comprises
  a base, fixed onto the machine frame,
  a linear motor, mounted to the base,
  a connecting rod,
  a wok lid holder,
  a bearing, and
  an elastic component,
  wherein the linear motor comprises a stator fixed to the base and a rotor moving up and down relative to the stator, the connecting rod connects the rotor and the wok lid holder; the wok lid holder is provided with a through hole for the hollow shaft to run through, a lower end of the hollow shaft is fixedly connected to the wok lid, while an upper end of the hollow shaft protrudes through the through hold; the wok lid holder is provided with a groove for receiving the bearing, the hollow shaft is slidingly engaged with the bearing, the hollow shaft is provided at the upper end thereof with a stopping ring engaging with the bearing to prevent the hollow shaft from sliding out from the wok lid holder when sliding relative to the bearing; an upper end of the elastic component is connected to the bearing, and a lower end of the elastic component is connected to the wok lid; the linear motor is connected to the master control device of the cooking machine to receive a command issued by the master control device on the basis of a preset recipe program and react accordingly to the command, so as to control the wok lid to cover/uncover the wok.

Preferably, when receiving a close-lid command, the linear motor drives the rotor to move downwards so as to further drive the wok lid holder and the hollow shaft to move downwards; after the wok lid has contacted an opening of the wok, the linear motor drives the rotor to continue moving downwards, so that the wok lid holder and the bearing both slide downwards relative to the hollow shaft to press the elastic component until the opening of wok is tightly sealed by the wok lid;
  when receiving an open-lid command, the linear motor drives the rotor to move upwards so as to further drive the wok lid holder and the hollow shaft to move upwards, so that the wok lid is lifted up away from the opening of the wok.

Preferably, the bearing comprises an inner ring, an outer ring and rolling elements provided therebetween, the hollow shaft is rollingly engaged with the inner ring, the inner ring is connected to the upper end of the elastic component; when the wok that is tightly sealed by the wok lid rotates under the control of a rotating device, the wok lid, the hollow shaft, the elastic component and the inner ring all rotate synchronously with the wok.

Preferably, the output pipe comprises an output hose and a guide tube, one end of the output hose is connected to the output end of the peristaltic pump, the other end of the output hose is connected to the guide tube; the guide tube is received inside the hollow shaft via a guide-tube frame, the guide-tube frame is rollingly engaged with the hollow shaft in such a manner that the guide tube remains stationary while the hollow shaft rotates.

Preferably, the base is provided with two position controlling detectors, a first position controlling detector and a second position controlling detector, to detect if the wok lid tightly seals an opening of the wok or is away from the opening of the wok and then send detection results to the master control device, the first position controlling detector is mounted at a position in which the first position controlling detector faces a bottom of the wok lid holder when the wok lid is in its initial position, and the second position controlling detector is mounted at another position in which the second position controlling detector faces the bottom of the wok lid holder when the wok lid tightly seals the opening of the wok.

The automatic seasoning adding apparatus applicable in a fully automated cooking machine provided by the embodiments of the present invention has the following advantages:

1. High level of precision. Under the control of the master control device, the automatic seasoning adding apparatus of the present invention puts the seasonings precisely in a predetermined sequence at a predetermined time, which realizes the precise control of the cooking process.

2. High level of automation. No manual handling operation is involved in the cooking process, except that the packaging bottle containing the liquid seasoning should be placed onto a bottle holder of the cooking machine by an operator. Therefore, the seasonings can be automatically put into the wok, no matter whether the wok is covered or uncovered.

3. Diversification of adding operation. Commonly used seasonings (cooking oil, liquid salt, soy sauce, vinegar, cooking wine, liquid sugar, spicy sauce, soup stock, sesame oil, etc.) are liquid, and they are packaged in separate packaging bottles which communicate with the seasoning pumping assembly. Some or all of the seasonings are chosen to be added into the wok by the seasoning pumping assembly according to a predetermined sequence and time. Therefore, a variety of dishes can be prepared by varying the seasonings, the sequence or the time for putting the seasonings.

4. High level of flexibility. The seasonings can be added into the wok, no matter whether the wok is rotating or is stationary, and no matter whether the wok is covered or uncovered.

5. High level of generality. The automatic seasoning adding apparatus of the present application facilitates a standardization of the package of the seasoning. As a result, the process of production, storage, delivery and selling of the seasoning can all be standardized. The electronic tag (two-dimension codes, IC card, RFID, etc.) of the packaging bottle provides an easy access to the detailed information of the contained seasoning.

BRIEF DESCRIPTION OF THE DRAWINGS

FIG. 10 is an enlarged schematic diagram showing a part of the wok lid controlling assembly illustrated in FIG. 9a.

DETAILED DESCRIPTION OF ILLUSTRATED EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
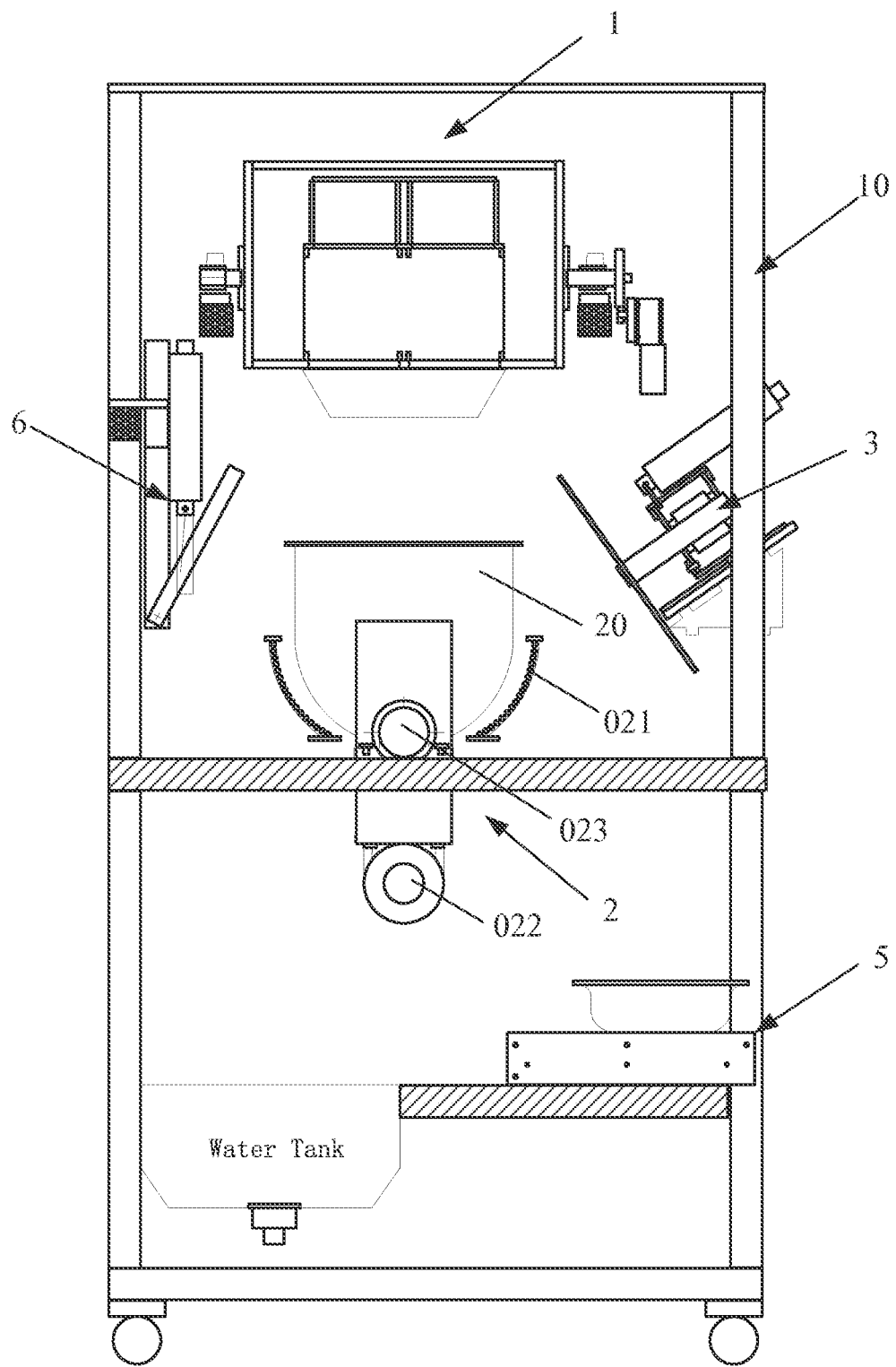
FIG. 1 is a schematic diagram showing the structure of a cooking machine with an automatic seasoning adding apparatus according to an embodiment of the present invention.
Figure 2:
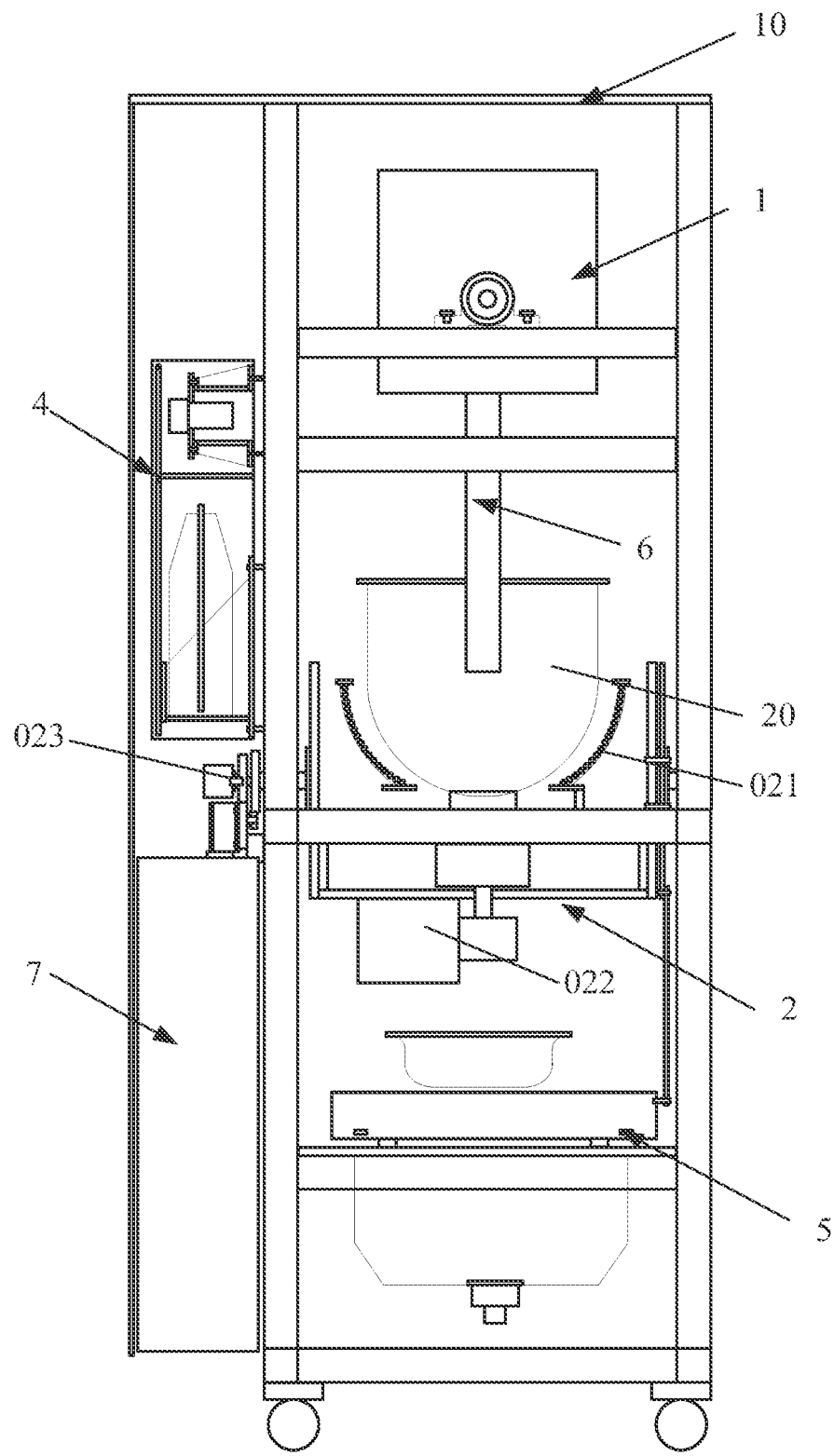
FIG. 2 is another schematic diagram showing the structure of the cooking machine illustrated in FIG. 1.

Referring to FIG. 1 and FIG. 2, an automatic seasoning adding apparatus provided by the embodiments of the present invention is applicable in a fully automated cooking machine, wherein the fully automated cooking machine comprises, but is not limited to: a housing 10, an automatic ingredient feeding apparatus 1, a wok apparatus 2, an automatic seasoning adding apparatus 4 (comprising a wok lid controlling assembly 3), an automatic dish exporting apparatus 5, an automatic wok washing apparatus 6 and a master control device 7, wherein the master control device 7 is used for accepting a preset recipe program and issuing commands on the basis of the preset recipe program. The automatic ingredient feeding apparatus 1, the wok apparatus 2, the wok lid controlling assembly 3, the automatic seasoning adding apparatus 4, the automatic dish exporting apparatus 5 and the automatic wok washing apparatus 6 are all connected to the master control device 7, they react accordingly to the command issued by the master control device 7, so as to realize an automatic cooking process.

The wok apparatus 2 comprises a wok 20, an electromagnetic heating coil 021, an electromagnetic heating device (not shown in the figures), a wok rotating device 022 and a wok working position controlling device 023. The electromagnetic heating coil 021 surrounds an outer wall of the wok 20 and is controlled under the electromagnetic heating device to heat the wok 20. The wok rotating device 022 is connected to the wok 20 for controlling the same to implement a 360-degree rotation, in this way, all ingredients can be well mixed in the wok. The wok working position controlling device 023 is used to couple the wok 20 to a machine frame and control the wok to swing with a swing angle of up to 360-degree, which allows an inclination of the wok 20 towards an expected working position. For example, in order to cover the wok with the wok lid, the wok working position controlling device 023 will swing the wok 20 to a working position where the wok 20 faces the wok lid. The electromagnetic heating device, the wok rotating device 022 and the wok working position controlling device 023 are all connected to the master control device 7 to receive the command issued by the master control device 7, and react accordingly to the command.

Figure 3:
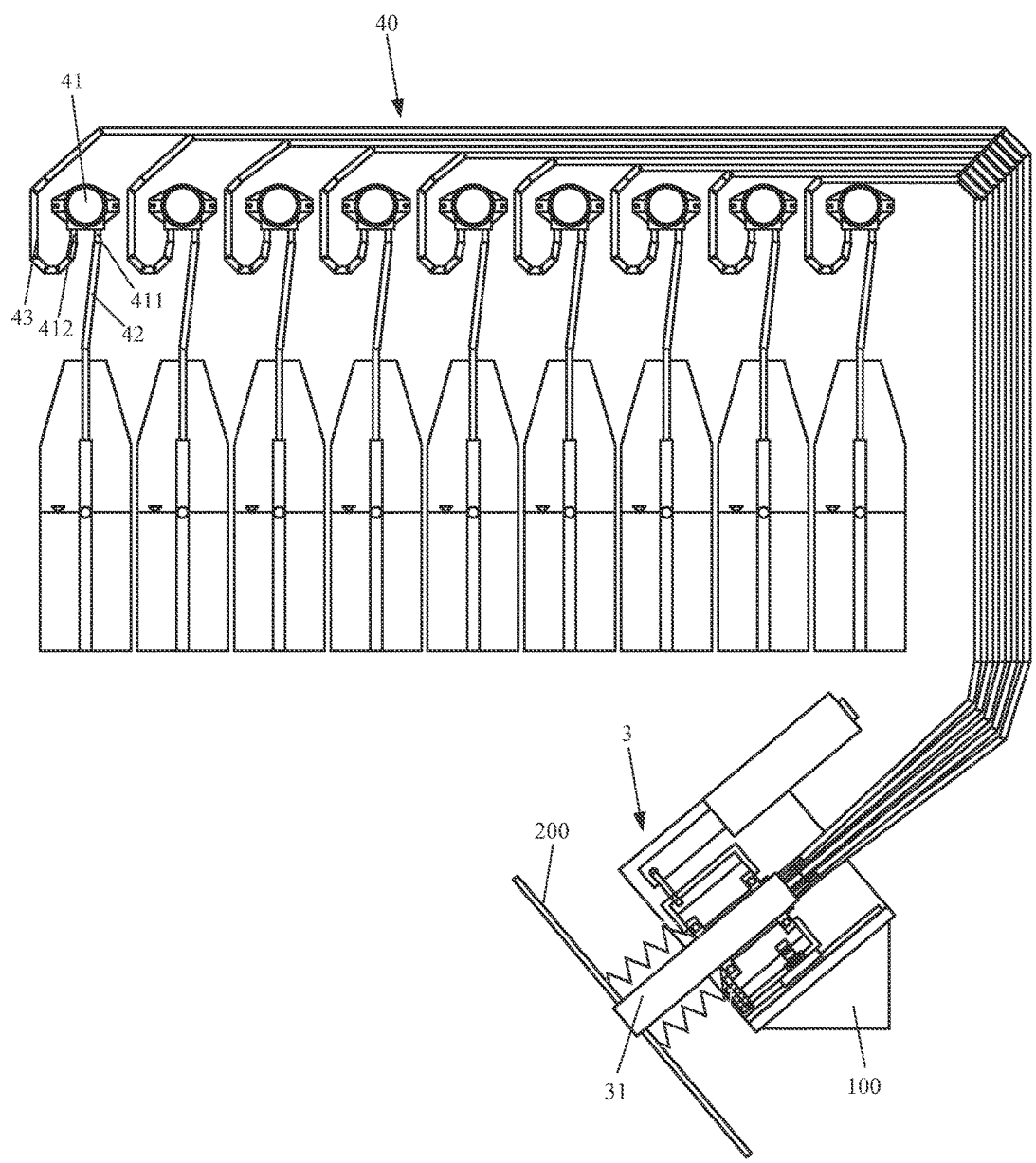
FIG. 3 is a schematic diagram showing the structure of an automatic seasoning adding apparatus applicable in a fully automated cooking machine according to an embodiment of the present invention.
Figure 4:
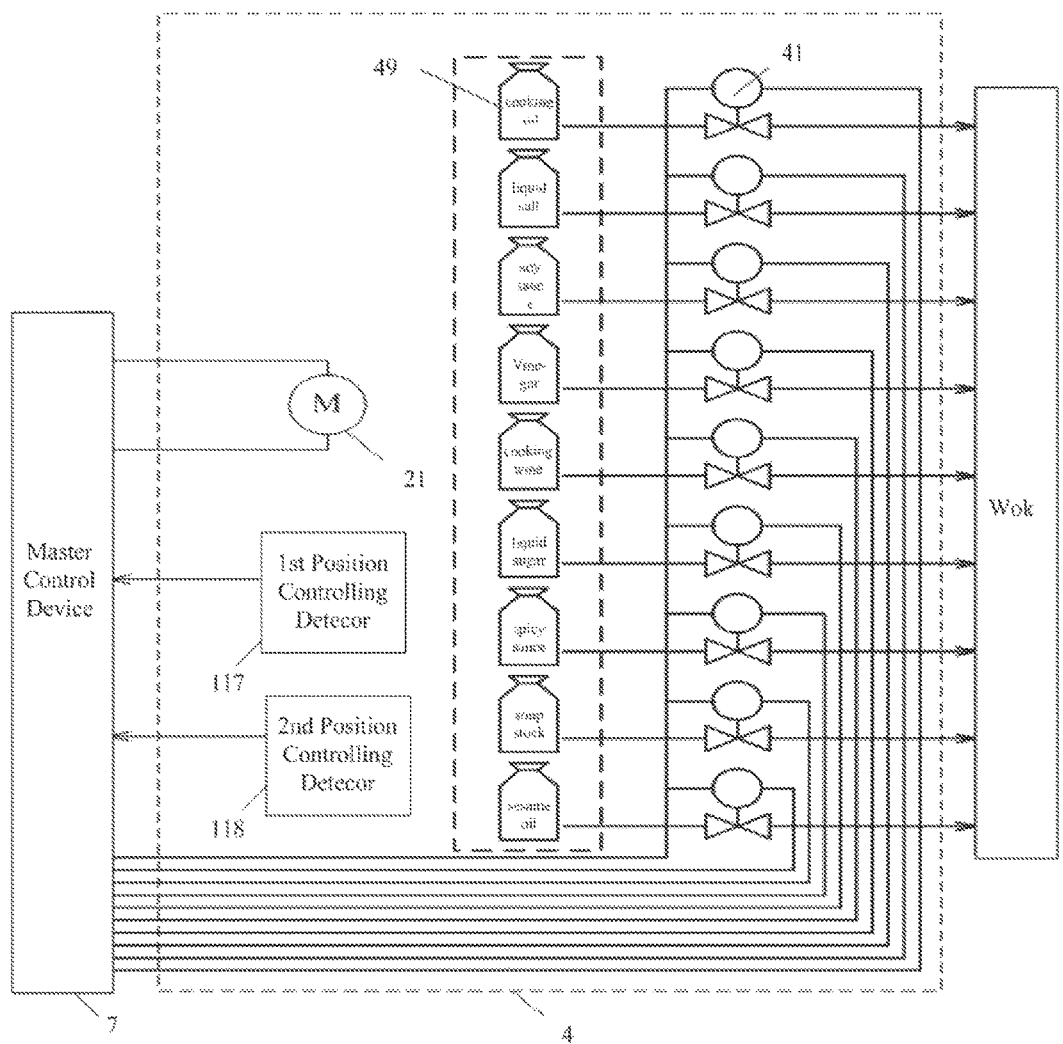
FIG. 4 is an electrical connection diagram of the automatic seasoning adding apparatus illustrated in FIG. 3.

Referring to FIG. 3-FIG. 4, the detailed structure of the automatic seasoning adding apparatus 4 applicable in a fully automated cooking machine according to an embodiment of the present invention will be described hereinafter. The automatic seasoning adding apparatus applicable in a fully automated cooking machine comprises a machine frame 100, a wok lid 200, a hollow shaft 31, a wok lid controlling assembly 3, and a seasoning pumping assembly 40, wherein the wok lid 200 is provided with an opening to be fixedly connected to and in communication with the hollow shaft 31, the wok lid controlling assembly 3 is provided on the machine frame 100 and is slidingly engaged with the hollow shaft 31 to control the wok lid 200 to cover/uncover the wok 20. The seasoning pumping assembly 40 comprises a plurality of peristaltic pumps 41, an input end 411 of each of the peristaltic pumps 41 is connected via an input pipe 42 to a packaging bottle 49 containing a liquid seasoning, while an output end 412 of each of the peristaltic pumps 41 is connected with an output pipe 43 that passes through the hollow shaft 31. Each of the peristaltic pumps 41 is connected to the master control device 7 to receive a command issued by the master control device on the basis of a preset recipe program, and pump, on the basis of the command, an appropriate amount of the liquid seasoning that sequentially passes through the input pipe 42, the output pipe 43 and finally flows into the wok 20. By precisely controlling the flow rate (rotation speed) and the pumping time of the peristaltic pump, the automatic seasoning adding apparatus of the embodiment of the present invention can realize a precise control of the pumping amount of the liquid seasoning to be added into the wok. Moreover, a better food safety can be achieved by using the automatic seasoning adding apparatus of the present invention, because the peristaltic pump effectively avoids the contamination of the liquid seasonings.

Figure 5:
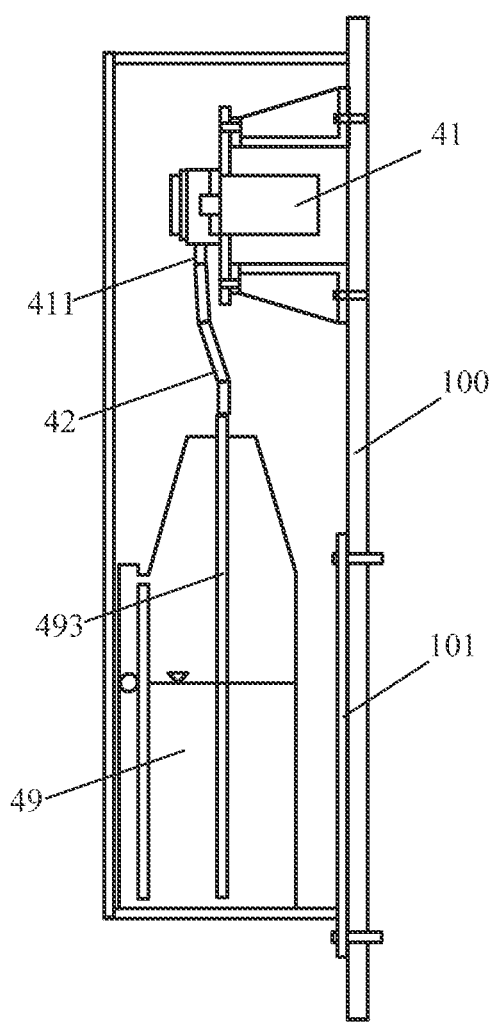
FIG. 5 is a schematic diagram showing the structure of a seasoning pumping assembly of the automatic seasoning adding apparatus illustrated in FIG. 3.
Figure 8:
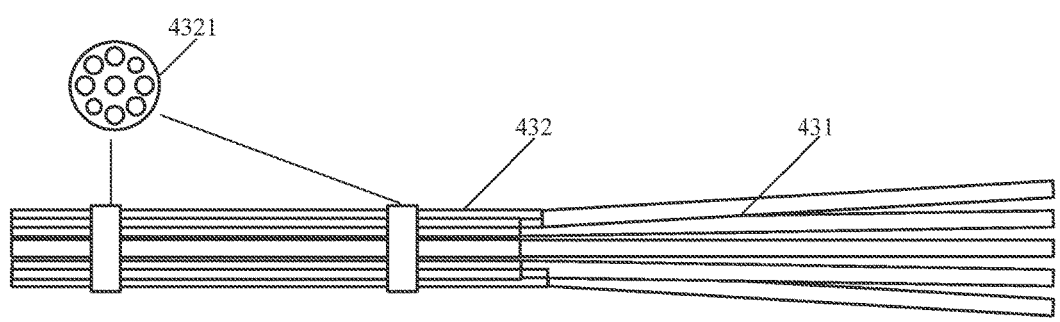
FIG. 8 is a schematic diagram showing the structure of an output pipe of a seasoning pumping assembly of the automatic seasoning adding apparatus illustrated in FIG. 3.

Referring to FIG. 3, FIG. 5 and FIG. 8, the detailed structure of the seasoning pumping assembly 40 of the automatic seasoning adding apparatus will be described hereinafter. In this embodiment, the seasoning pumping assembly 40 is provided with nine peristaltic pumps 41 for respectively pumping nine different kinds of seasoning, each of the peristaltic pumps 41 is fastened to the machine frame with a fastener. Each of the peristaltic pumps 41 comprises an input end 411 and an output end 412, wherein the input end 411 is connected to one end of the input pipe 42, and the other end of the input pipe 42 is connected to the packaging bottle 49 containing a liquid seasoning. The output end 412 is connected to one end of the output pipe 43, and the other end of the output pipe 43 passes through the hollow shaft 31 to arrive at the wok lid 200. The input pipe 42 is an input hose, and the output pipe 43 comprises an output hose 431 and a guide tube 432 communicating with the output hose 431. One end of the output hose 431 is connected to the output end 412 of the peristaltic pump 41, and the other end of the output hose 431 is connected to the guide tube 432. The guide tube 432 is received inside the hollow shaft 31 via a guide-tube frame 4321. See FIG. 8, the guide-tube frame 4321 is a flat disc with a plurality of through holes for the guide tubes 432 to pass through. The guide-tube frame 4321 may be rollingly engaged with the hollow shaft 31 in such a manner that the guide tube 432 remains stationary while the hollow shaft 31 rotates.

All the peristaltic pumps 41 are connected to the master control device, so the master control device can control the peristaltic pumps to pump an appropriate amount of one or more liquid seasonings. The pumped liquid seasoning passes from the input pipe 42 to the output pipe 43 and finally flows into the wok 20. For example, once the master control device issues a seasoning-adding command (such as add 25 ml cooking oil into the wok), the seasoning pumping assembly turns on the corresponding peristaltic pump 41 (the peristaltic pump for pumping the cooking oil up). The pumping amount is precisely controlled via the flow rate (rotation speed) and the pumping time of the peristaltic pump. The pumping sequence of different seasonings and the pumping amount are both determined by the preset recipe program.

In this embodiment, all the seasonings are liquid and are filled in different containers (packaging bottle 49) respectively. The seasonings may include cooking oil, liquid salt, soy sauce, vinegar, cooking wine, liquid sugar, spicy sauce, soup stock, sesame oil, etc. In this embodiment, nine packaging bottles 49 are used to stock nine common seasonings. Each packaging bottle corresponds to a peristaltic pump 41 to pump the liquid seasoning into the wok. Furthermore, a bottle holder 101 for supporting the packaging bottle 49 is provided on the machine frame 100.

Figure 6:
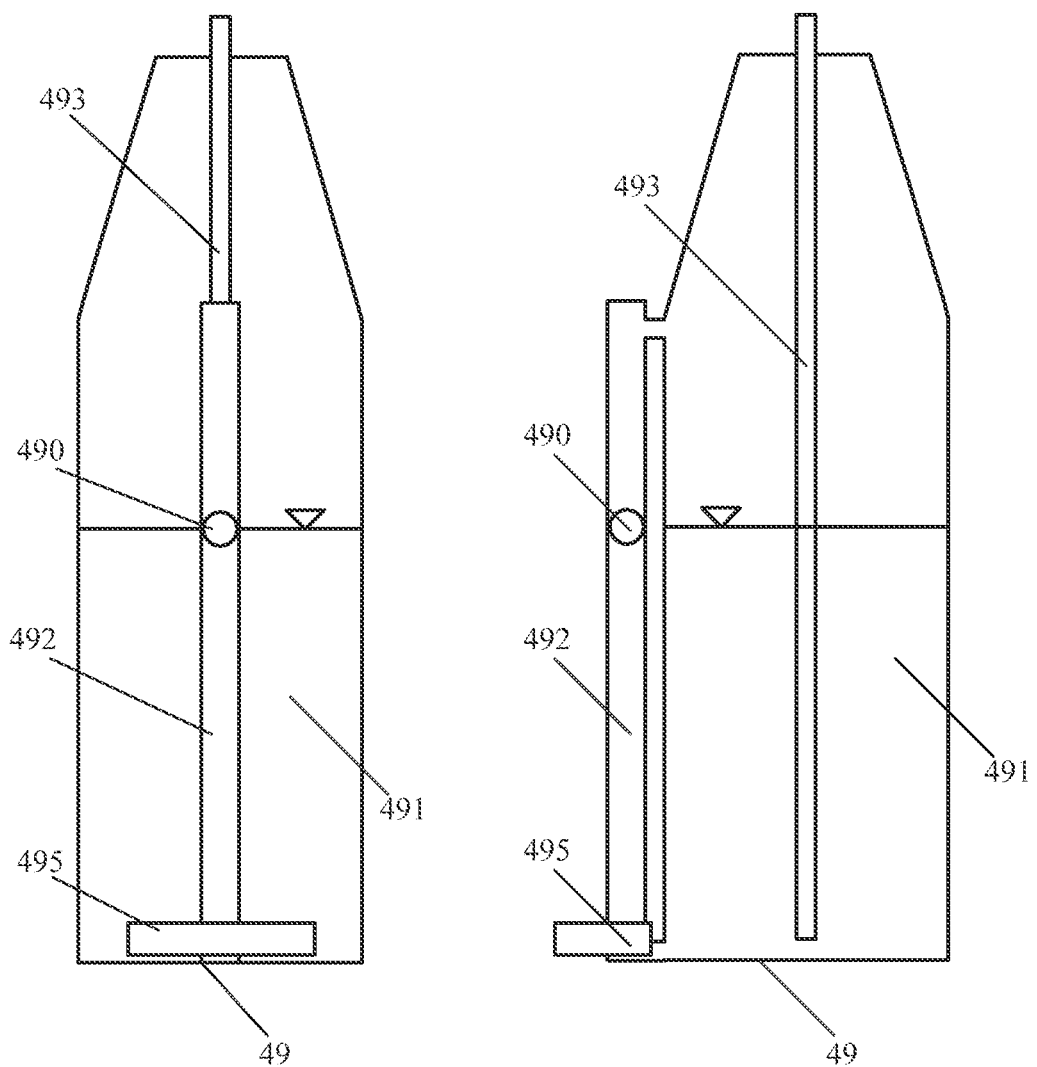
FIG. 6 is a schematic diagram showing the structure of a packaging bottle of a seasoning pumping assembly of the automatic seasoning adding apparatus illustrated in FIG. 3.
Figure 7:
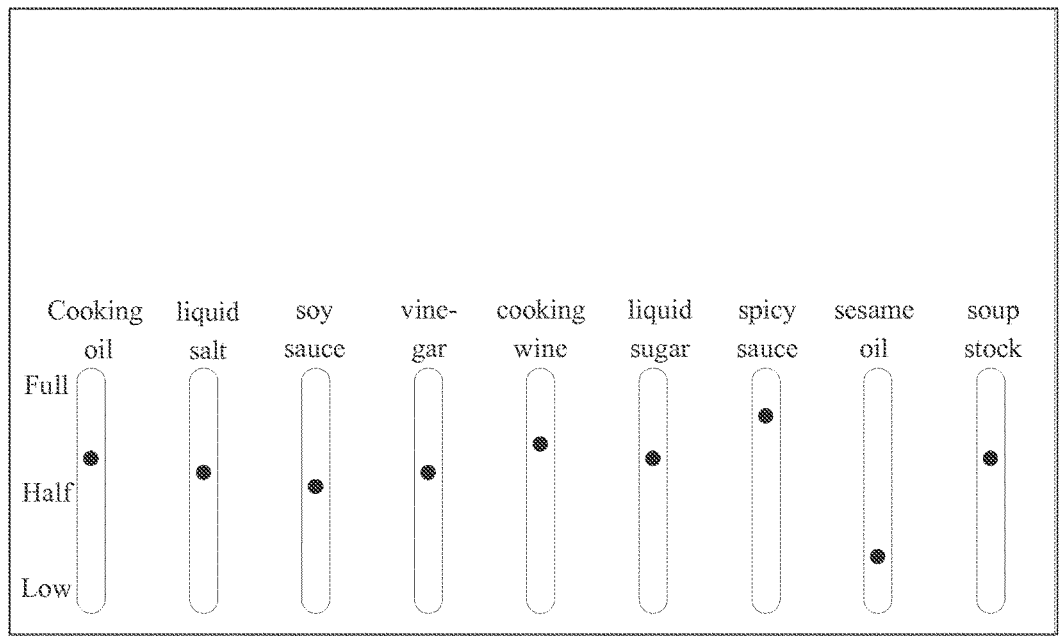
FIG. 7 is a schematic diagram showing the volumes of liquid seasonings in packaging bottles of a seasoning pumping assembly of the automatic seasoning adding apparatus illustrated in FIG. 3.

Referring to FIG. 6-FIG. 7, the packaging bottle 49 comprises a liquid seasoning storing cavity 491 and a liquid level indicating cavity 492 that communicates with the liquid seasoning storing cavity 491, a level of the liquid seasoning in the liquid seasoning storing cavity 491 is indicated by a floating ball 490 in the liquid level indicating cavity 492. In this embodiment, three reference levels (full, half, low) are provided for the user to see the remaining amount of the liquid seasoning in the packaging bottle 49. The liquid seasoning storing cavity 491 is provided with a delivery tube 493 that connects to the input pipe 42 to deliver the liquid seasoning. Furthermore, preferably, a minimum level detector 495 is arranged at a bottom of the packaging bottle 49 and close to the liquid level indicating cavity. When the minimum level detector detects the floating ball has moved to a minimum level position, it outputs alerting signals to the master control device to inform the user to supplement the liquid seasoning or replace the packaging bottle.

Figure 9A:
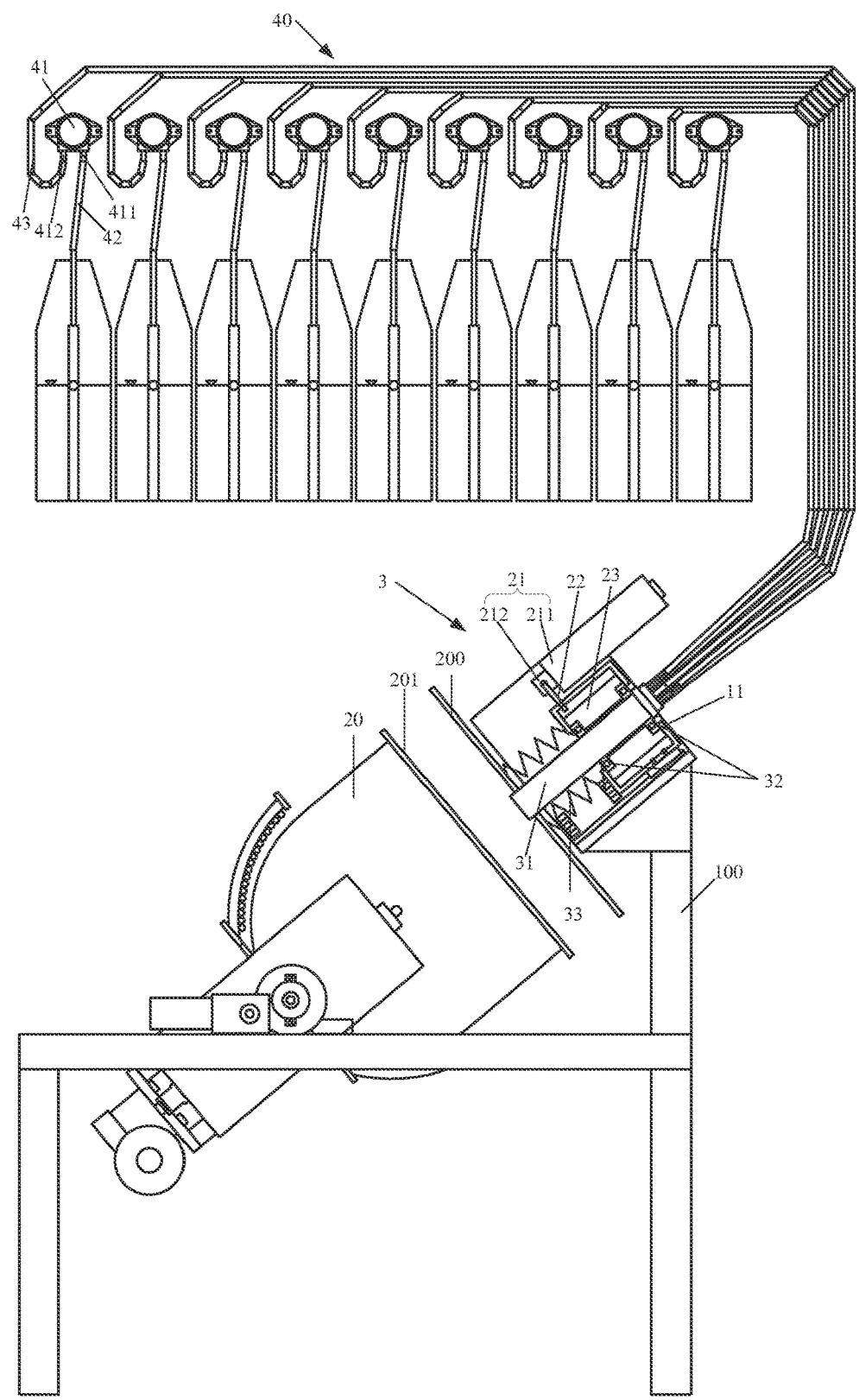
FIG. 9a-FIG. 9c are schematic diagrams showing different states of a wok lid controlling assembly of the automatic seasoning adding apparatus illustrated in FIG. 3.
Figure 9B:
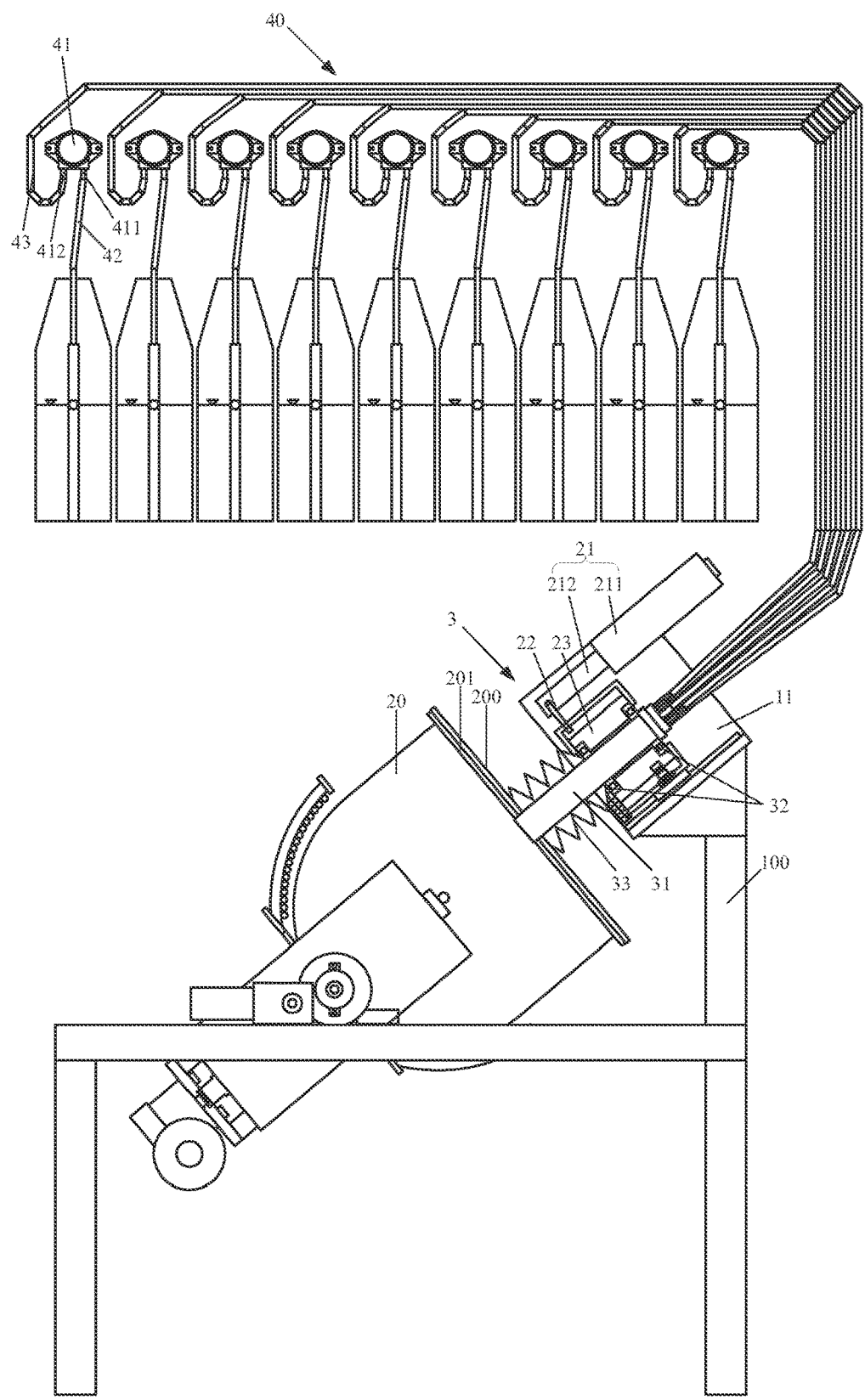
Figure 9C:
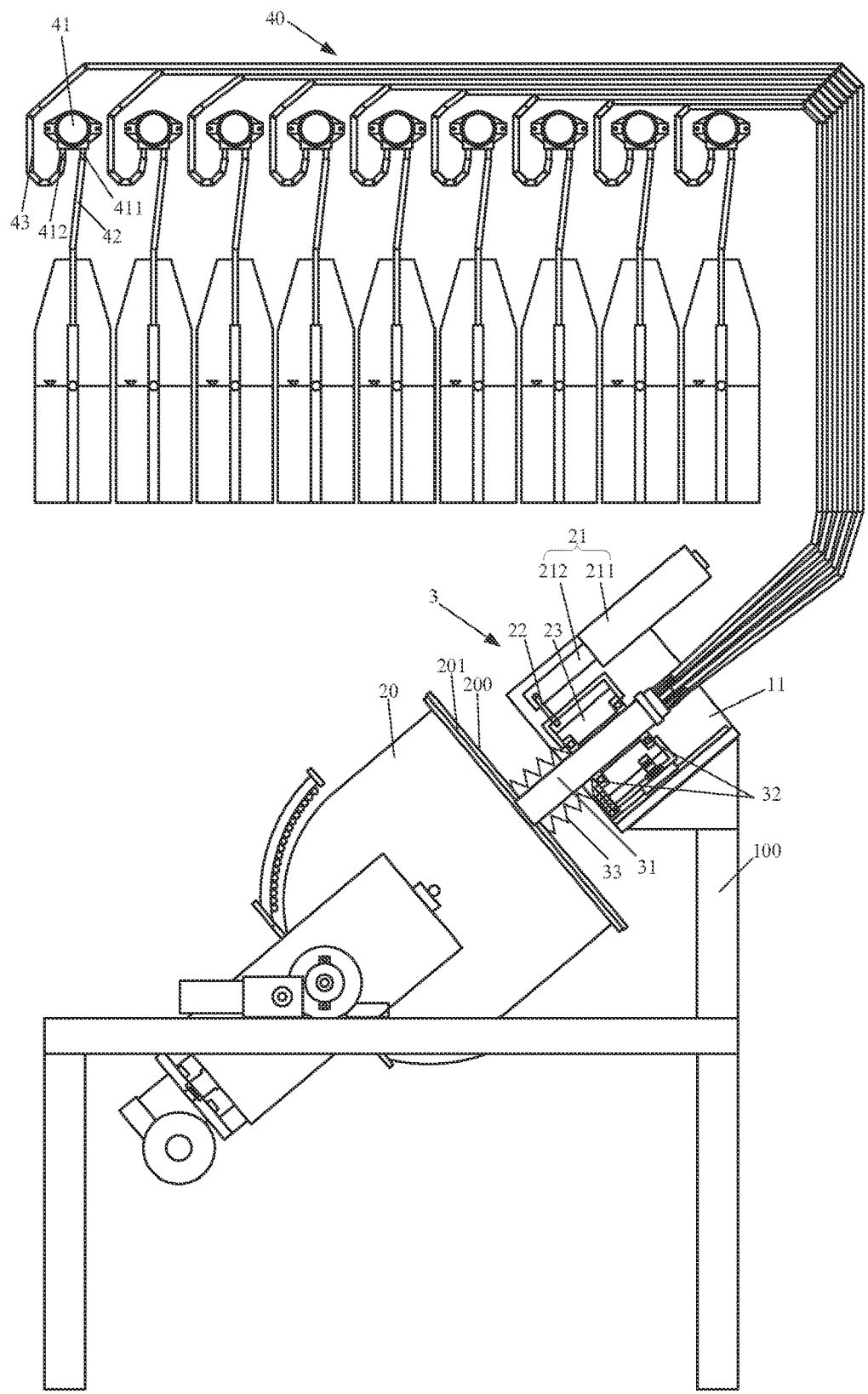

Referring to FIG. 4, FIG. 5 and FIG. 9a-FIG. 9c, the detailed structure of the wok lid controlling assembly 3 will be described hereinafter. It's understandable that FIG. 9a-FIG. 9c show the structure of a same embodiment of the wok lid controlling assembly but in different states. The wok lid controlling assembly 3 comprises a base 11, a linear motor 21, a connecting rod 22, a wok lid holder 23, a bearing 32, and an elastic component 33, wherein the linear motor 21 comprises a stator 211 fixed to the base and a rotor 212 moving up and down relative to the stator 211, the connecting rod 22 connects the rotor 212 and the wok lid holder 23. The wok lid holder 23 is provided with a through hole 231 for the hollow shaft 31 to run through, a lower end 311 of the hollow shaft 31 is fixedly connected to the wok lid 200, while an upper end 312 of the hollow shaft 31 protrudes through the through hole 231. The wok lid holder 23 is provided with a groove 232 for receiving the bearing 32, the hollow shaft 31 is slidingly engaged with the bearing 32. The hollow shaft 31 is provided at the upper end 312 thereof with a stopping ring 313 engaging with the bearing 32 to prevent the hollow shaft 31 from sliding out from the wok lid holder 23 when sliding relative to the bearing 32. An upper end 331 of the elastic component 33 is connected to the bearing 32, and a lower end 332 of the elastic component 33 is connected to the wok lid 200.

Referring to FIG. 4, The linear motor 21 is connected to the master control device 7 of the cooking machine to receive a command issued by the master control device on the basis of a preset recipe program and react accordingly to the command.

When receiving a close-lid command, the linear motor 21 drives the rotor 212 to move downwards so as to further drive the wok lid holder 23, the hollow shaft 31 and the wok lid 200 to move downwards; after the wok lid 200 has contacted an opening 201 of the wok, the linear motor 21 drives the rotor 212 to continue moving downwards, so that the wok lid holder 23 and the bearing 32 both slide downwards relative to the hollow shaft 31 to press the elastic component 33 until the opening 201 of wok is tightly sealed by the wok lid 200 (FIG. 9c shows the wok being tightly sealed with the wok lid).

When receiving an open-lid command, the linear motor 21 drives the rotor 212 to move upwards so as to further drive the wok lid holder 23 and the hollow shaft 31 to move upwards, so that the wok lid 200 is lifted up away from the opening of the wok (FIG. 9a shows the wok lid being lifted up away from the opening of the wok).

Figure 10:
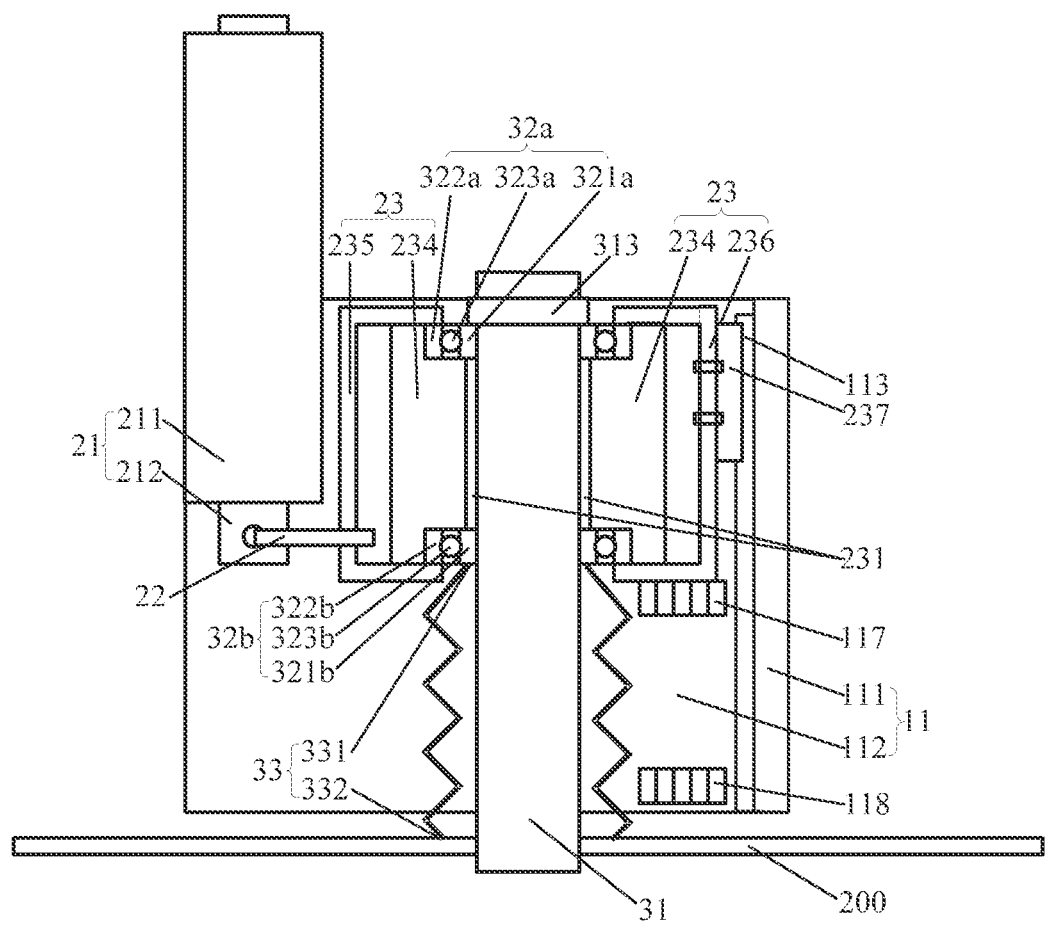
Figure 11:
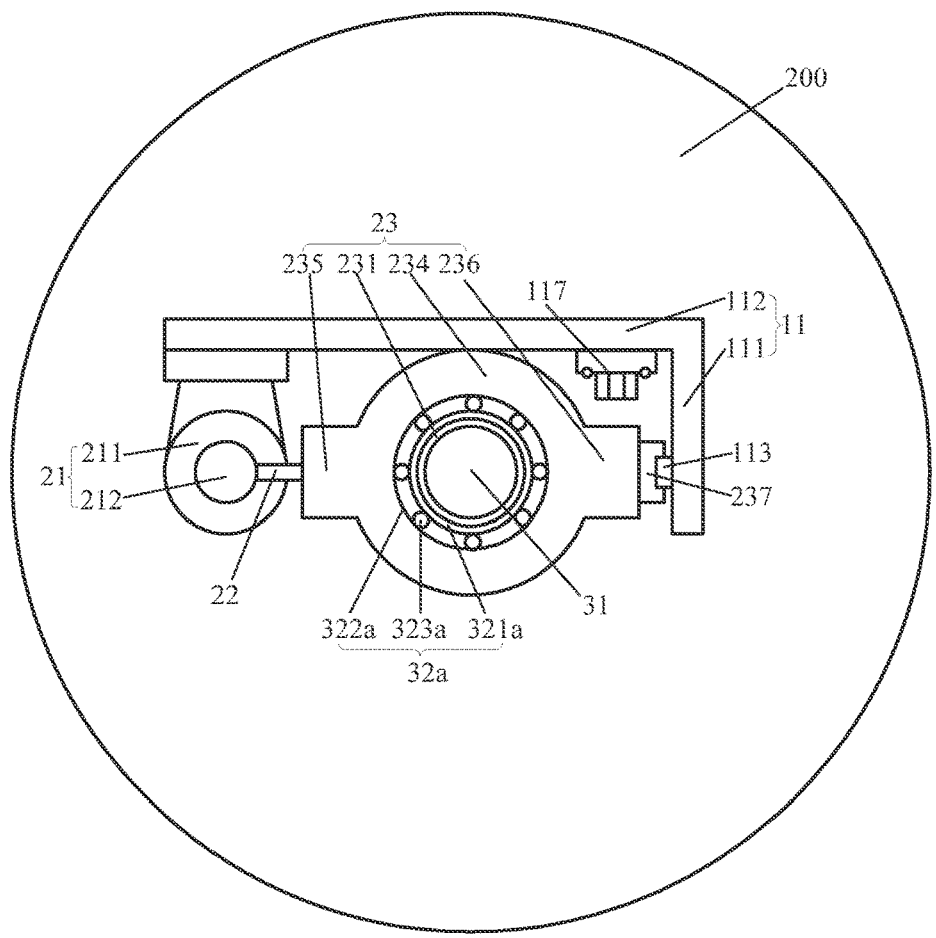
FIG. 11 is another schematic diagram showing the wok lid controlling assembly illustrated in FIG. 10.

Referring to FIG. 10-FIG. 11, in this embodiment, preferably, the base 11 comprises a joint piece 111 and a mounting piece 112, wherein the joint piece 111 connects the mounting piece 112 at right angle. The base 11 is fixed onto the machine frame 100 via the joint piece 111. The stator 211 of the linear motor 21 is fixed to the mounting piece 112. The stator 211 at least comprises a shell and a magnet within the shell. The rotor 212 comprises an iron core and a coil around the iron core. The linear motor 21 can convert electrical energy directly to mechanical energy for linear motion. In this way, by controlling the power supply of the linear motor 21, the master control device can control the movement time and movement distance of the rotor 212.

Figure 12:
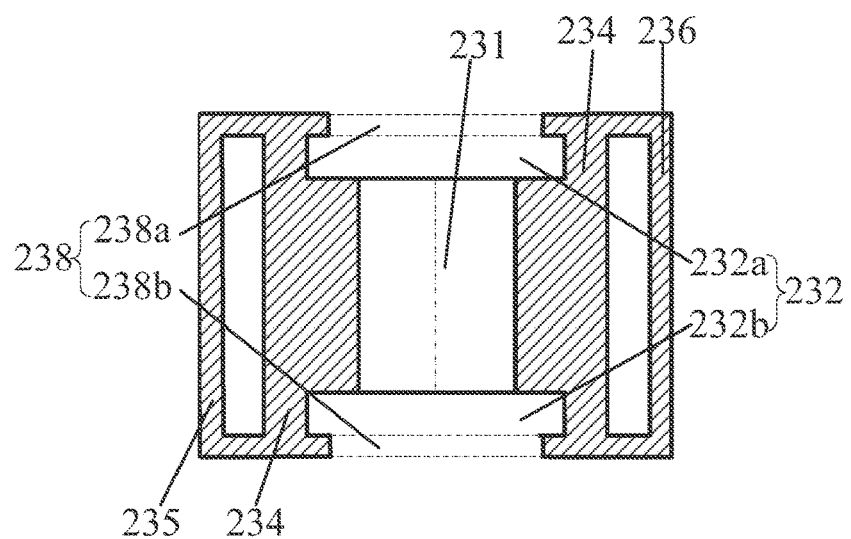
FIG. 12 is a schematic diagram showing the structure of a wok lid holder of the wok lid controlling assembly illustrated in FIG. 10.

Referring to FIG. 12, preferably, the wok lid holder 23 comprises a cylinder 234, and a left arm 235 and a right arm 236 that are molded integrally with the cylinder 234, the cylinder 234 is provided with the through hole 231 at the center thereof, the diameter of the through hole 231 is a bigger than the diameter of the hollow shaft. The left arm 235 is connected to the rotor 212 via the connecting rod 22, the right arm 236 is provided with a slide block 237, and the joint piece 111 of the base 11 is provided with a slide rail 113 for slidingly engaging with the slide block 237. Driven by the rotor 212 of the linear motor 21, the wok lid holder 23 can move upwards or downwards relative to the base 11. The cylinder 234 of the wok lid holder 23 is provided with two openings 238 (an upper opening 238a and a lower opening 238b). To be more specific, the upper opening 238a is provided at the top of the cylinder 234 of the wok lid holder 23, while the lower opening 238b is provided at the bottom of the cylinder 234 of the wok lid holder 23. The cylinder 234 of the wok lid holder 23 is further provided with two grooves (an upper groove 232a and a lower groove 232b). To be more specific, the upper groove 232a is provided in the cylinder 234 of the wok lid holder 23 and near the upper opening 238a, while the lower groove 232b is provided in the cylinder 234 of the wok lid holder 23 and near the lower opening 238b. The upper groove 232a is used for receiving an upper bearing 32a, and the lower groove 232b is used for receiving a lower bearing 32b. The through hole 231, the openings 238, and the grooves 232 are concentric, and the diameters of the through hole 231, the openings 238 and the grooves 232 are gradually increased, so a part of the bearings 32 is exposed.

In details, the upper bearing 32a comprises an inner ring 321a, an outer ring 322a and rolling elements 323a provided therebetween, and the lower bearing 32b comprises an inner ring 321b, an outer ring 322b and rolling elements 323b provided therebetween. When the upper bearing 32a is received in the upper groove 232a and the lower bearing 32b is received in the lower groove 232b, the outer ring 322a of the upper bearing 32a is secured to the top of the cylinder 234 and the inner ring 321a is exposed. The out ring 322b of the lower bearing 32b is secured to the bottom of the cylinder 234 and the inner ring 321b is exposed. With the upper bearing 32a in the upper groove 232a, the inner ring 321a of the upper bearing 32a abuts against the stopping ring 313 of the hollow shaft 31. The stopping ring 313 can prevent the hollow shaft 31 from falling off the wok lid holder 23 when the hollow shaft 31 is in its initial state (reset state, i.e. the wok lid is totally lifted up) or when the hollow shaft 31 is moving up and down. Besides, when receiving a command to lift the wok lid 200, the stopping ring 313 can pass an upward force from the wok lid holder 23 to the hollow shaft 31 so that the hollow shaft 31 drives the wok lid 200 to move back to its initial position. The inner ring 321b of the lower bearing 32b is connected to the upper end 331 of the elastic component 33. The lower end 332 of the elastic component 33 is connected to the top of the wok lid 200. In this embodiment, the elastic component 33 comprises two springs. The two springs are respectively placed at two sides of the hollow shaft 31 and have a same distance from the hollow shaft 31. In the initial state (the wok lid is totally lifted up), the two springs 33 may be relaxed or stretched. When the wok lid 200 tightly seals the opening 201 of the wok, the two springs 33 are compressed.

On one hand, the hollow shaft 31 is slidingly engaged with the inner rings 321a, 321b of the bearings 32. When the linear motor 21 receives a close-lid command, it drives the rotor 212 to move downwards so as to further drive the hollow holder 23 and the bearings 32 to move downwards. Due to the gravity, the hollow shaft 31 and the wok lid 200 also move downwards, so that the wok lid 200 moves towards the opening of the wok. During the downward movement of the hollow shaft 31 and the wok lid 200, the hollow shaft 31 slidingly engages the inner rings 321a, 321b and creates friction to prevent the hollow shaft 31 from falling too fast, thereby avoiding a collision between the wok lid 200 and the opening 201 of the wok. Since the guide tube 432 of the seasoning pumping assembly 40 is received in the hollow shaft 31 via a guide-tube frame 4321, the guide tube 432 will move up or down along with the movement of the hollow shaft 31.

On the other hand, the hollow shaft 31 is rollingly engaged with the inner rings 321a, 321b. When the wok 20 that is tightly sealed by the wok lid 200 rotates under the control of a wok rotating device, the wok lid 200, the hollow shaft 31, the elastic component 33 and the inner rings 321a, 321b all rotate synchronously with the wok 20. What's more, during the synchronous rotation, due to the elastic component 33, the wok lid 200 and the opening 201 of the wok are tightly sealed all through the rotation process, in other words, the wok lid 200 won't be apart from the opening 201 of the wok during the rotation. Besides, since the guide-tube frame 4321 is rollingly engaged with the hollow shaft 31, the guide tube keeps stationary and won't rotate along with the rotation of the hollow shaft 31.

In addition, in this embodiment, the base 11 is provided with a first position controlling detector 117 and a second position controlling detector 118. The first position controlling detector 117 is mounted at a position in which the first position controlling detector 117 faces a bottom of the right arm 236 of the wok lid holder 23 when the wok lid is in its initial state (reset state, i.e. the wok lid is totally lifted up from the opening of the wok), therefore the first position controlling detector 117 is used to detect if the wok lid is totally lifted up from the opening of the wok. The second position controlling detector 118 is mounted at another position in which the second position controlling detector 118 faces the bottom of the right arm 236 of the wok lid holder 23 when the wok lid 200 tightly seals the opening 201 of the wok, therefore the second position controlling detector 118 is used to detect if the wok lid tightly seals the opening of the wok. The first position controlling detector 117 and the second position controlling detector 118 send their detection results to the master control device 7 (see FIG. 4). Base on the detection results, the master control device controls the power supply of the stator 211 of the linear motor 21, so as to control the movement of the rotor 212. The first position controlling detector 117 and the second position controlling detector 118 may adopt infrared detection technologies. Once the first position controlling detector 117 or the second position controlling detector 118 is blocked by the bottom of the of the right arm 236 of the wok lid holder 23, the first position controlling detector 117 or the second position controlling detector 118 sends a signal to the master control device accordingly.

Referring to FIG. 13a-FIG. 13c and FIG. 14a-FIG. 14c, a detail description about a working process of a wok lid controlling assembly according to an embodiment of the present invention will be described hereinafter. It should be known that in an automated cooking machine, when the master control device executes a command that requires to close the wok lid, such as a close-lid command, a cooking command or a seasoning adding command, the master control device firstly controls the wok working position controlling device to swing the wok 20 by a specific swing angle, which ensures that the opening 201 of the wok is facing the wok lid 200, only after that, the master control device allows the wok lid controlling assembly to start closing the wok lid.

The following description will introduce how the wok lid controlling assembly closes the wok lid.

Figure 13A:
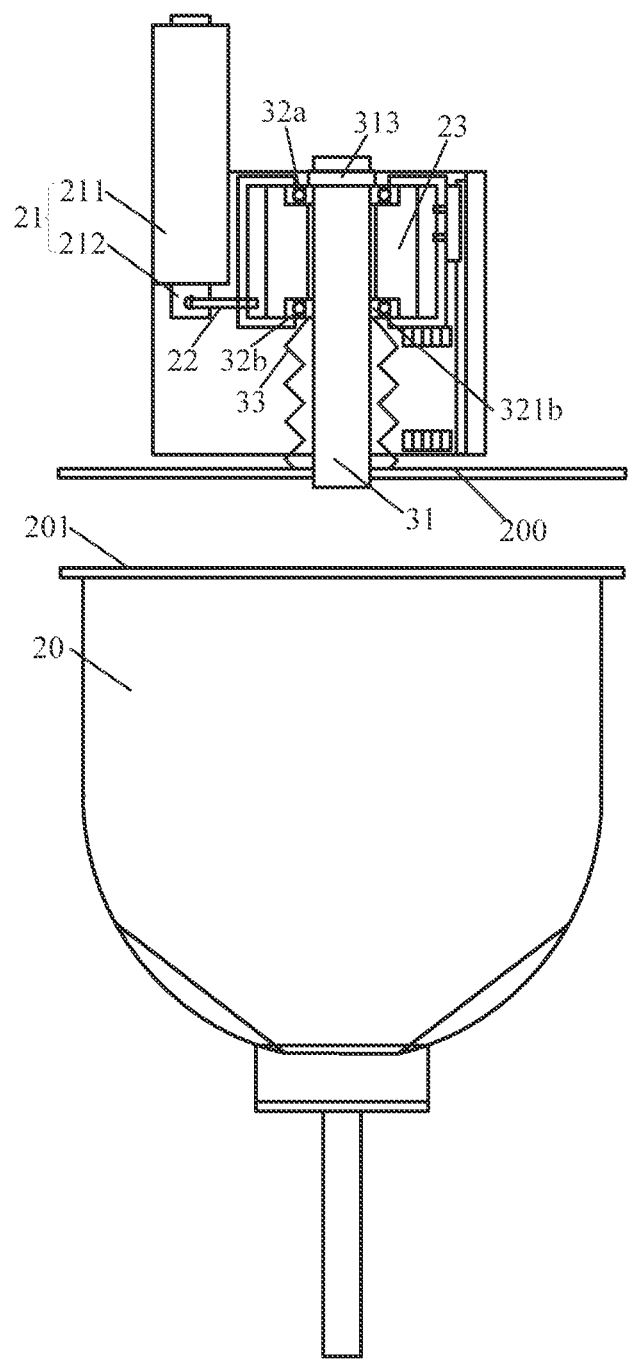
FIG. 13a-FIG. 13c showing a process of closing a wok lid by a wok lid controlling assembly according to an embodiment of the present invention.

Referring to FIG. 13a, in the initial state, the wok lid 200 is away from the opening 201 of the wok (totally lifted up), the linear motor 21 is powered off, the rotor 212 is stationary relative to the stator 211. Because of the connecting rod 22, the wok lid holder 23 is stationary relative to the base 11. Due to the stopping ring 313 and the upper bearing 32a (the upper bearing 32a supports the stopping ring 313), the hollow shaft 31 and the wok lid 200 remain stationary. In the meantime, the elastic component 33 that one end of which is connected to the inner ring 321b of the lower bearing 32b while the other end of which is connected to the top of the wok lid 200 is in a relax state or in a stretched state.

Figure 13B:
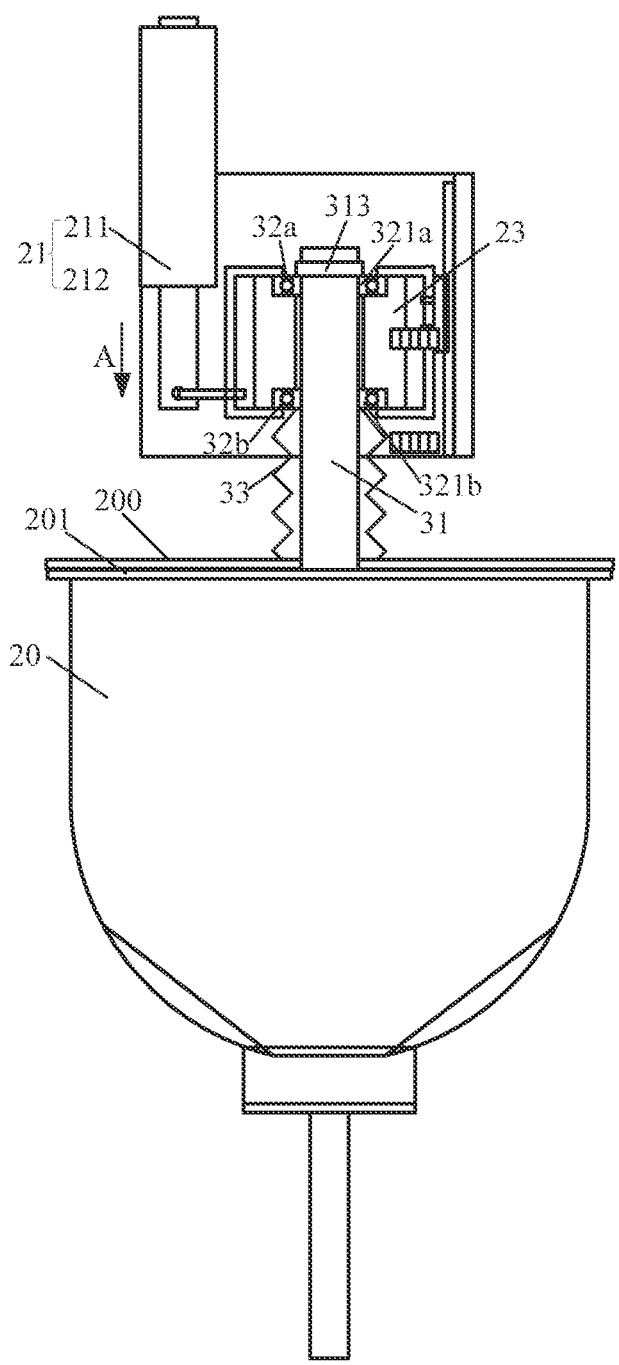

Referring to FIG. 13b, when the wok lid controlling assembly receives a close-lid command, the stator 211 of the linear motor 21 is powered on. The linear motor 21 thus drives the rotor 212 to move downwards relative to the stator 211 (the moving direction is indicated by the arrow A), so as to further drive the wok lid holder 23 and the bearings 32 to move downwards. Due to the gravity, the hollow shaft 31 and the wok lid 200 also move downwards, so that the wok lid 200 moves towards the opening 201 of the wok. During the downward movement of the hollow shaft 31 and the wok lid 200, the hollow shaft 31 is slidingly engaged with the inner rings 321a, 321b and creates friction to prevent the hollow shaft 31 from falling too fast, that is, the wok lid 200 can move slowly towards the opening 201 of the wok until the wok lid 200 contacts the opening 201 of the wok.

Figure 13C:
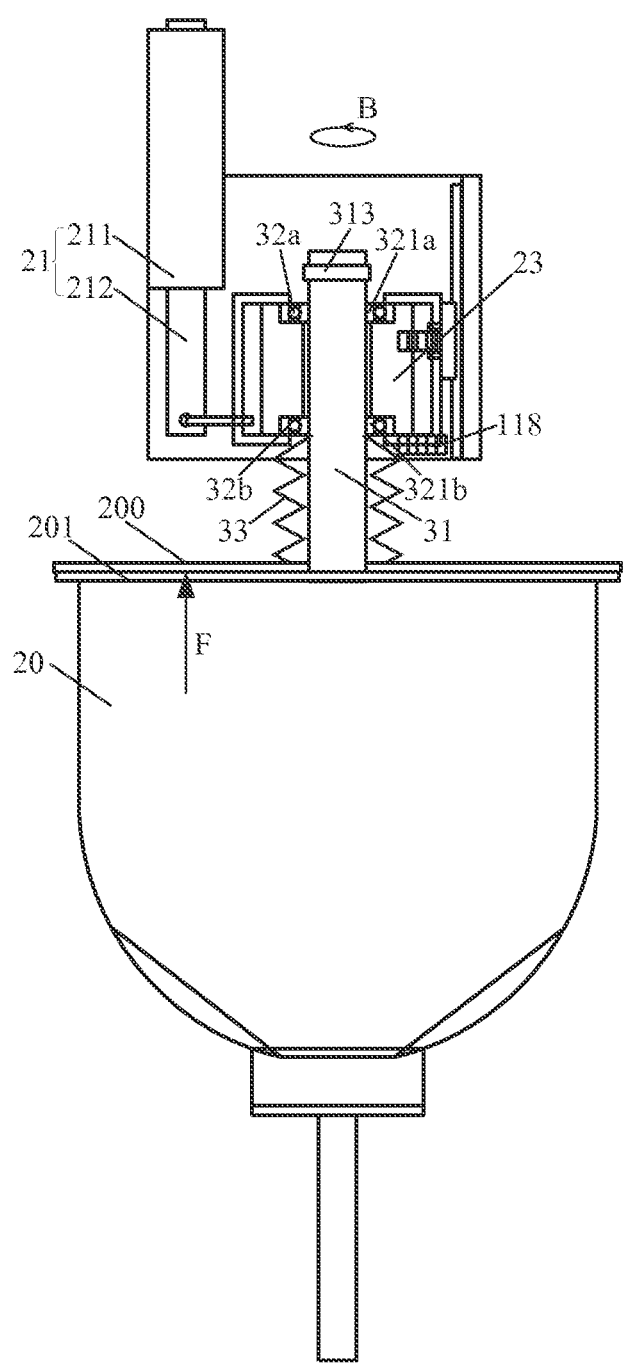

Referring to FIG. 13c, once the wok lid 200 contacts the opening 201 of the wok, the hollow shaft 31 and the wok lid 200 are stopped from moving downwards, meanwhile, the linear motor 21 drives the rotor 212 to continue moving downwards, so that the wok lid holder 23 further drives the upper bearing 32a and the lower bearing 32b to slide downwards relative to the hollow shaft 31 and press the elastic component 33. The compressed elastic component 33 produces a force to the wok lid 200, so that the wok lid 200 presses hard on the opening 201 of the wok. The wok lid 200 thus suffers a counterforce from the opening 201 of the wok. The direction of the counterforce is indicated by the arrow F. The second position controlling detector 118 won't send a signal to the master control device to stop the rotor 212 from moving downwards until it is blocked by the bottom of the right arm 236 of the wok lid holder 23, at this moment, the opening 201 of the wok is supposed to be tightly sealed by the wok lid 200. When the wok that is tightly sealed by the wok lid rotates under the control of a rotating device, the wok lid 200, the hollow shaft 31, the elastic component 33 and the inner rings 321a, 321b all rotate synchronously with the wok (the direction of the rotation is indicated by the arrow B, it's can be understood that, the rotation can also be clockwise). What's more, during the synchronous rotation, due to the elastic component 33, the wok lid 200 and the opening 201 of the wok are tightly sealed all through the rotation process, in other words, the wok lid 200 won't be apart from the opening 201 of the wok during the rotation.

The following description will introduce how the wok lid controlling assembly opens the wok lid.

Figure 14A:
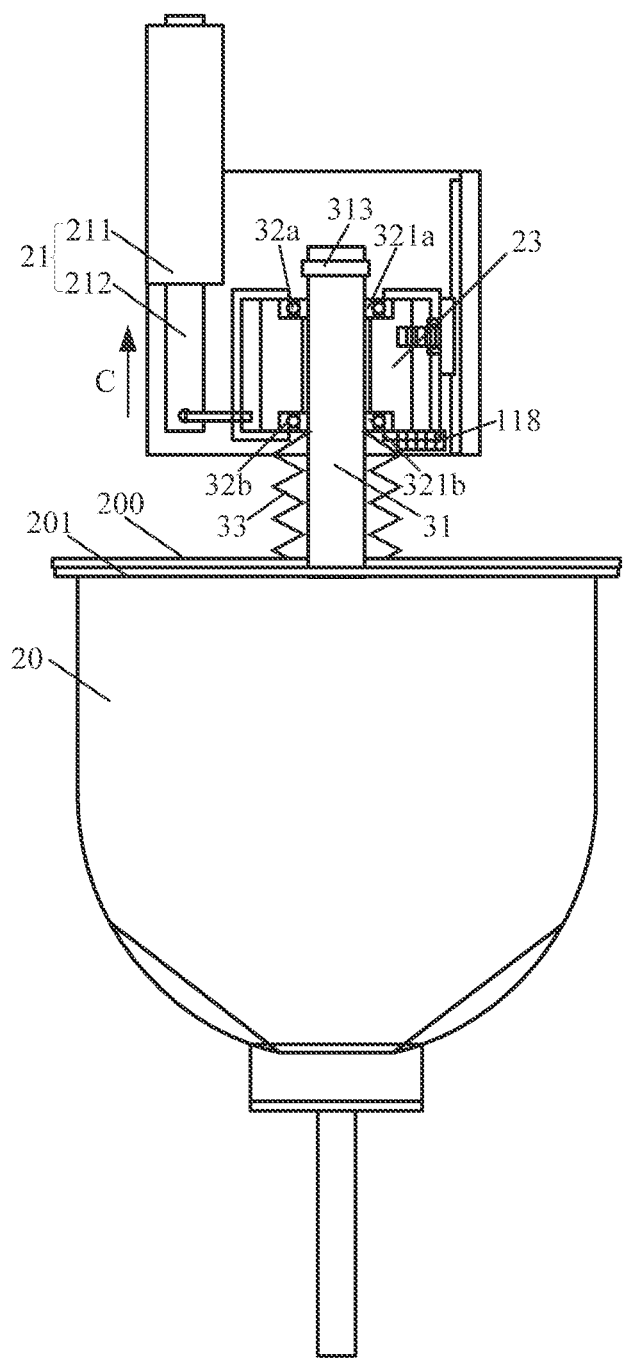
FIG. 14a-FIG. 14c showing a process of opening a wok lid by a wok lid controlling assembly according to an embodiment of the present invention.

Referring to FIG. 14a, when the opening 201 of the wok is tightly sealed by the wok lid 200, once the wok lid controlling assembly receives an open-lid command, the stator 211 of the linear motor 21 is powered on (the current is in a direction opposite to that of the above close-lid case), the linear motor 21 drives the rotor 212 to move upwards relative to the stator 211 (the moving direction is indicated by the arrow C) so as to further drive the wok lid holder 23, the upper bearing 32a and the lower bearing 32b to move upwards relative to the hollow shaft 31.

Figure 14B:
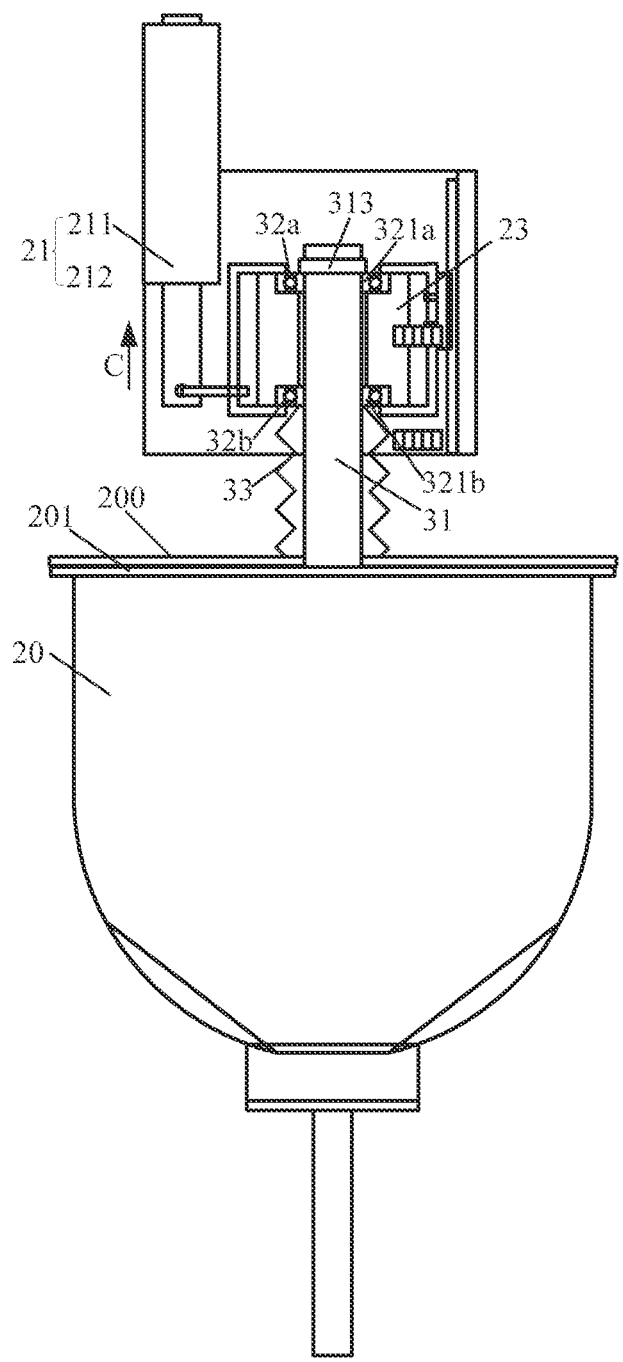

Referring to FIG. 14b, when the elastic component returns to its initial state, the inner ring 321a of the bearing 32a abuts against the stopping ring 313 of the hollow shaft 31. After that, the rotor 212 keeps driving the wok lid holder 23 to move upwards, this movement further drives the hollow shaft 31 and the wok lid 200 to move upwards, so that the wok lid 200 is lifted up away from the opening 201 of the wok.

Figure 14C:
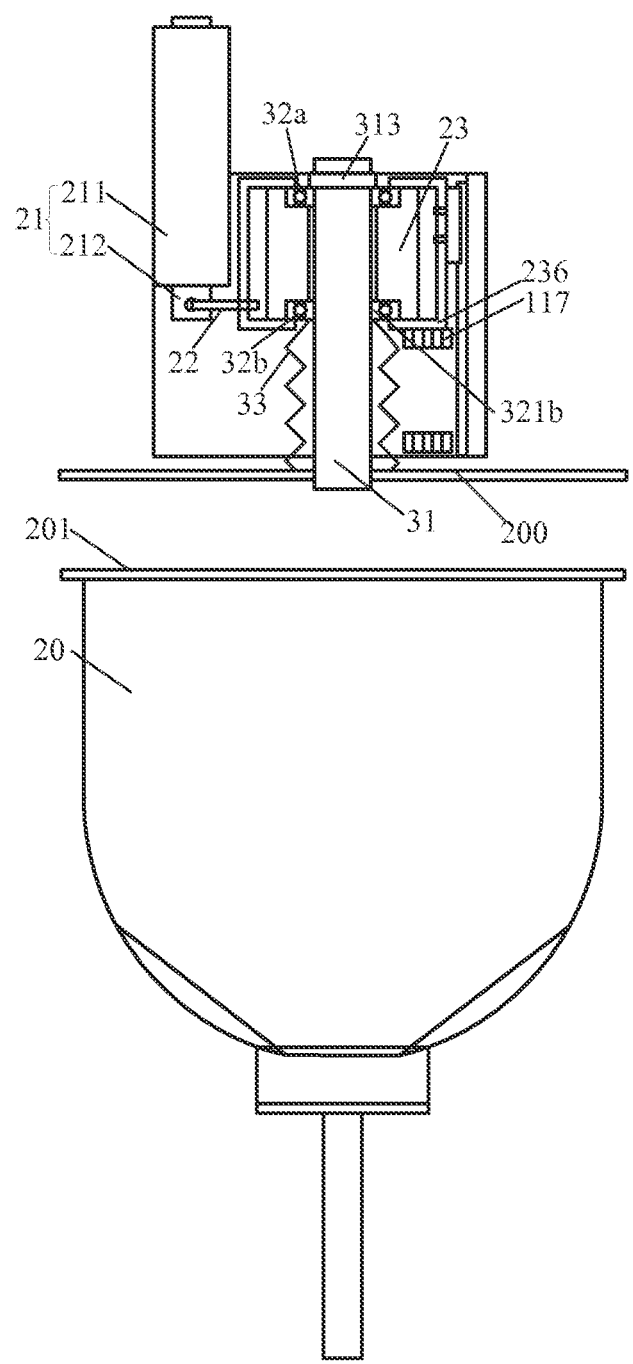
Figure 15:
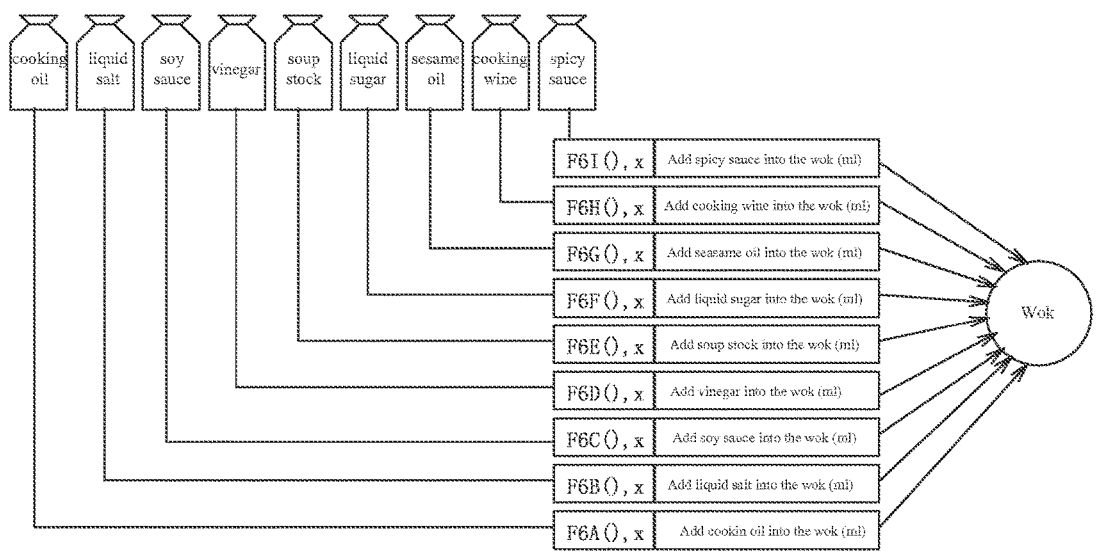
FIG. 15 is a schematic diagram showing seasoning-adding commands received by the automatic seasoning adding apparatus illustrated in FIG. 3.

Referring to FIG. 14c, once the first position controlling detector 117 is blocked by the bottom of the right arm 236 of the wok lid holder 23, the first position controlling detector 117 sends a signal to the master device to stop the rotor 212 from moving upwards, at this moment, the wok lid controlling assembly is supposed to have returned to its initial state.

The automatic seasoning adding apparatus of the present invention is applicable in a fully automated cooking machine. In the following embodiment, the fully automated cooking machine can be programmed with a set of commands. The set of commands is named vmmda 1.0 and is especially for Chinese cooking.

vmmda 1.0 includes 9 commands, F1: ingredient-adding command, F2: heat-adjusting command, F3: stop-heating command, F4: rotating command, F5: time-delay command, F6: seasoning-adding command, F7: open-lid command, F8: dish-exporting command, F9: halting command. The recipe program is formed by a sequence of commands. The fully automated cooking machine executes the commands in order.

The recipe program can be written in XML file and encoded in gb2312 for better information exchange and information sharing. So besides the fully automated cooking machine of the present invention, the recipe program can also be applied to a virtual cooking machine, cloud services, an IOT (internet of things) terminal, and so on.

The recipe program consists of two parts, a description part and a command sequence part.

The description part generally includes: a recipe program version, a recipe number, a recipe name, a creator, a creation date, an ingredient packaging version, and raw ingredients.

The command sequence part is made up of the vmmda 1.0 commands. As illustrated in Table 1, the syntax of the command sequence is as follows:

index, command; comment (can be omitted)

Each line has one command. The whole command sequence should not be over 5000 lines.

TABLE 1

| Index | Command | Comment |
|---|---|---|
| 1 | F2( ), 1; | Heat-adjusting command, parameter: 1(low)-10(high) |
| 2 | F5( ), 30; | Time-delay command, parameter: seconds |
| 3 | F6A( ), 70; | Seasoning A(oil)-adding command, parameter: mL |

The fully automated cooking machine executes the recipe program according to the index order. However, the index order can be omitted. When the index is omitted, the fully automated cooking machine executes the recipe program from top to bottom. In the following example, the command sequences in Table 2 (a), Table 2 (b) and Table 2 (c) have the same function.

TABLE 2 (a)

| 1 | F2( ), 1; | Heat-adjusting command, parameter: 1(low)-10(high) |
|---|---|---|
| 2 | F5( ), 30; | Time-delay command, parameter: duration(seconds) |
| 3 | F6A( ), 70; | Seasoning A(oil)-adding command, parameter: volume (mL) |

TABLE 2 (b)

| F2( ), 1 |
|---|
| F5( ), 30 |
| F6A( ), 70 |

TABLE 2 (c)

| 2 | F5( ), 30; |
|---|---|
| 1 | F2( ), 1; |
| 3 | F6A( ), 70; |

Any appropriate text editor can be used to write the recipe program. The recipe program can be written in XML file and encoded in gb2312. The root element is "cooking_machine_recipe", the child elements include: "ingredient_package" and "recipe_command".

The root element "cooking_machine_recipe" has the following attributes: a recipe program version, a recipe number, a recipe name, a creator and a creation date. For example:
<cooking_machine_recipe, version='vmmda 1.0' recipe_number='xjb0001' recipe_name='stir-fry Shredded Cabbage' creator='xjb' date='03/07/12'>

The child element "ingredient package" has the following attributes: a version, a compartment-A ingredient, a compartment-B ingredient, a compartment-C ingredient, a compartment-D ingredient. For example:
<ingredient_package version='vmmda 1.0' compartment_A_ingredient='shredded cabbage' compartment_B_ingredient='shredded cabbage' compartment_C_ingredient='accessory ingredient' compartment_D_ingredient=''></ingredient_package>

The child element "recipe_command" has the following attributes: an index, a command code and a parameter. The value of the child element "recipe command" is the comment. For example:
<recipe_command index='2' command_code='F2(3)' parameter='3'> heat-adjusting command, parameter 1 (low)-10 (high)</recipe_command>

The following example shows the format of a complete program.
<?xml version='1.0' encoding='gb2312'?>
<cooking_machine_recipe version='vmmda 1.0' recipe_number='xjb0001' recipe_name='stir-fry Shredded Cabbage' creator='xjb' date='03/07/12'?>
<ingredient_package version=version'vmmda 1.0' compartment_A_ingredient='shredded cabbage' compartment_B_ingredient='shredded cabbage' compartment_C_ingredient='accessory ingredient' compartment_D_ingredient=''></ingredient_package>
<recipe_command index='1' command_code='F4(3)' parameter='3'> rotating command, parameter 1 (slow)-8 (fast)</recipe_command>
<recipe_command index='2' command_code='F2(3)' parameter='3'> heat-adjusting command, parameter 1 (low)-10 high</recipe_command></cooking_machine_recipe>

As an example, a recipe program for cooking stir-fry Shredded Cabbage will be given as below.

```xml
<?xml version='1.0' encoding='gb2312'?>
<cooking_machine_recipe version='vmmda 1.0'
  recipe_number='xjb0001' recipe_name='stir-fry Shredded Cabbage' estimated_time='437' creator='xjb'
  date='03/07/12'>
<ingredient_package version='vmmda 1.0'
  compartment_A_ingredient='shredded cabbage'
  compartment_B_ingredient='shredded cabbage'
  compartment_C_ingredient='shredded cabbage'
  compartment_D_ingredient='accessory ingredients (garlics etc.)'></ingredient_package>
<recipe_command index='1' command_code='F4( )'
  parameter='3'> rotating command, parameter 1(slow)-8 (fast)</recipe_command>
<recipe_command index='2' command_code='F2( )'
  parameter='1'> heat-adjusting command, parameter 1(low)-10(high)</recipe_command>
<recipe_command index='3' command_code='F6A( )'
  parameter='40'> seasoning-A(oil)-adding command, parameter is volume(ml)</recipe_command>
<recipe_command index='4' command_code='F3'
  parameter='0'> stop-heating command, no parameter</recipe_command>
<recipe_command index='5' command_code='F1D'
  parameter='0'> ingredient-adding command, add ingredient D into the wok, no parameter</recipe_command>
<recipe_command index='6' command_code='F4( )'
  parameter='3'> rotating command, parameter 1(slow)-8 (fast)</recipe_command>
<recipe_command index='7' command_code='F2( )'
  parameter='2'> heat-adjusting command, parameter 1(low)-10(high)</recipe_command>
<recipe_command index='8' command_code='F5( )'
  parameter='20'> time-delay command, parameter is duration (seconds)</recipe_command>
<recipe_command index='9' command_code='F3'
  parameter='0'> stop-heating command, no parameter</recipe_command>
<recipe_command index='10' command_code='F1A'
  parameter='0'> ingredient-adding command, add ingredient A into the wok, no parameter</recipe_command>
<recipe_command index='11' command_code='F1B'
  parameter='0'> ingredient-adding command, add ingredient B into the wok, no parameter</recipe_command>
<recipe_command index='12' command_code='F1C'
  parameter='0'> ingredient-adding command, add ingredient C into the wok, no parameter</recipe_command>
<recipe_command index='13' command_code='F4( )'
  parameter='5'> rotating command, parameter 1(slow)-8 (fast)</recipe_command>
<recipe_command index='14' command_code='F2( )'
  parameter='2'> heat-adjusting command, parameter 1(low)-10(low)</recipe_command>
<recipe_command index='15' command_code='F5( )'
  parameter='100'> time-delay command, parameter is duration (seconds)</recipe_command>
<recipe_command index='16' command_code='F6C( )'
  parameter='50'> seasoning-C(soy sauce)-adding command, parameter is volume(ml) </recipe_command>
<recipe_command index='17' command_code='F6D( )'
  parameter='20'> seasoning-D(vinegar)-adding command, parameter is volume(ml) </recipe_command>
<recipe_command index='18' command_code='F6G( )'
  parameter='10'> seasoning-G(sesame oil)-adding command, parameter is volume(ml) </recipe_command>
<recipe_command index='19' command_code='F5( )'
  parameter='100'> time-delay command, parameter is duration (seconds)</recipe_command>
<recipe_command index='20' command_code='F3'
  parameter='0'> stop-heating command, no parameter </recipe_command>
<recipe_command index='21' command_code='F5( )'
  parameter='100'> time-delay command, parameter duration (seconds)</recipe_command>
<recipe_command index='22' command_code='F9'
  parameter='0'> halting command, halt the cooking machine, no parameter</recipe_command></cooking-machine-recipe>
```

The F6: seasoning-adding command of vmmda 1.0 is used to add a seasoning into the wok. The F6 command can add the seasonings while the wok is covered. The F6 command of vmmda 1.0 can be applied with 9 seasonings, they are A-cooking oil, B-liquid salt, C-soy sauce, D-vinegar, E-soup stock, F-liquid sugar, G-sesame oil, H-cooking wine, I-spicy sauce. The F6 command of vmmda 1.0 has two parameters. The syntax of F6 command is: F6X( ), "parameter: volume", wherein X represents one of the seasonings A,B,C,D,E,F,G,H,I; and the volume can range from 1-200 mL. For example, F6A( ),25 and F6H( ),5 are correct F6 command. F6A( ),25 means adding 25 mL cooking oil into the wok. F6H( ),5 means adding 5 mL cooking wine into the wok. The general execution time of the F6 command of vmmda 1.0 is (volume/2) seconds.

The F7: open-lid command of vmmda 1.0 is used to lift the wok lid up. The F7 command of vmmda 1.0 has no parameter (or has an invalid parameter). The syntax of the F7 command is: F7( ) or F7( ),0. By executing the F7 command, the wok lid will be lifted up so air will come into the wok, which may be a necessary process for cooking some Chinese dishes. The general execution time of the F7 command of vmmda 1.0 is 5 seconds. In the automatic seasoning adding apparatus provided by the embodiments of the present invention, the master control device 7 can execute the F6 command and the F7 command of vmmda 1.0, and issues corresponding commands, then the wok lid controlling assembly 3 and the seasoning pumping assembly 40 act accordingly to the commands issued by the master control device. For example, when the master control device 7 executes F6A( ),4 command, it issues the command to switch on the peristaltic pumps of the cooking oil packaging bottle and pump out 4 mL cooking oil. In this process, the pumping amount is controlled via the running time of the peristaltic pump.

The F7: open-lid command of vmmda 1.0 is used to open the wok lid. However, it can be understood that, some other recipe commands already include the demand to open or close the wok lid. The recipe command and its corresponding demands are listed below:

F4: rotating command—adjust the wok to a working position for rotating/close the wok lid/rotates the wok.

F6: seasoning-adding command—adjust the wok to a working position for rotating/add a seasoning.

F1: ingredient-adding command—open the wok lid/adjust the wok to a working position for adding ingredient/add the ingredient.

F2/F3: heat-adjusting command—don't need to care about the working position.

F9: halting command—turn off the heat/open the wok lid, stop rotating/adjust the wok to a working position for adding ingredients F5: maintaining command—maintain the previous state.

The automatic seasoning adding apparatus applicable in a fully automated cooking machine provided by the embodiments of the present invention has the following advantages:

1. High level of precision. Under the control of the master control device, the automatic seasoning adding apparatus of the present invention puts the seasonings precisely in a predetermined sequence at a predetermined time, which realizes the precise control of the cooking process.

2. High level of automation. No manual handling operation is involved in the cooking process, except that the packaging bottle containing the liquid seasoning should be placed onto a bottle holder of the cooking machine by an operator. Therefore, the seasonings can be automatically put into the wok, no matter whether the wok is cover/uncovered.

3. Diversification of adding operation. Commonly used seasonings (cooking oil, liquid salt, soy sauce, vinegar, cooking wine, liquid sugar, spicy sauce, soup stock, sesame oil, etc.) are liquid, and they are packaged in separate packaging bottles which communicate with the seasoning pumping assembly. Some or all of the seasonings are chosen to be added into the wok by the seasoning pumping assembly according to a predetermined sequence and time. Therefore, a variety of dishes can be prepared by varying the seasonings, the sequence or the time for putting the seasonings.

4. High level of flexibility. The seasonings can be added into the wok, no matter whether the wok is rotating or is stationary, and no matter whether the wok is covered/uncovered.

5. High level of generality. The automatic seasoning adding apparatus of the present application facilitates a standardization of the package of the seasoning. As a result, the process of production, storage, delivery and selling of the seasoning can all be standardized. The electronic tag (two-dimension codes, IC card, RFID, etc.) of the packaging bottle provides an easy access to the detailed information of the contained seasoning.

The foregoing descriptions are merely exemplary embodiments of the present disclosure, but are not intended to limit the present disclosure. Any modifications, equivalent substitutions, and improvements made within the spirit and principle of the present disclosure shall fall within the protection scope of the present disclosure.

What is claimed is:

1. An automatic seasoning adding apparatus applicable in a fully automated cooking machine, comprising:
a machine frame,
a wok lid,
a hollow shaft,
a wok lid controlling assembly, and
a seasoning pumping assembly,
wherein the wok lid is provided with an opening to be fixedly connected to and in communication with the hollow shaft, the wok lid controlling assembly is provided on the machine frame and is slidingly engaged with the hollow shaft to control the wok lid to cover/uncover a wok, the wok lid controlling assembly is rollingly engaged with the hollow shaft to control the hollow shaft and the wok lid to rotate synchronously with the wok;
the seasoning pumping assembly comprises a plurality of peristaltic pumps, an input end of each of the plurality of peristaltic pumps is connected via an input pipe to a packaging bottle containing a liquid seasoning, while an output end of each of the plurality of peristaltic pumps is communicated with the wok lid via an output pipe that passes through the hollow shaft;
all the plurality of peristaltic pumps are connected to a processor to receive a command issued by the processor on a basis of a preset recipe program, and pump, on the basis of the command, a pumping amount of the liquid seasoning controlled by a flow rate and a pumping time of each of the plurality of peristaltic pumps that sequentially passes through the input pipe and the output pipe and finally flows into the wok.

2. The apparatus as claimed in claim 1, wherein the output pipe comprises an output hose and a guide tube, one end of the output hose is connected to the output end of each of the plurality of peristaltic pumps, the other end of the output hose is connected to the guide tube; the guide tube is received inside the hollow shaft via a guide-tube frame which is rollingly engaged with the hollow shaft and the guide tube remains stationary while the hollow shaft rotates.

3. The apparatus as claimed in claim 1, wherein the packaging bottle comprises a liquid seasoning storing cavity and a liquid level indicating cavity that communicates with the liquid seasoning storing cavity, a level of the liquid seasoning in the liquid seasoning storing cavity is indicated by a floating ball in the liquid level indicating cavity.

4. The apparatus as claimed in claim 3, wherein the input pipe is an input hose, the liquid seasoning storing cavity is provided with a delivery tube that connects to the input pipe.

5. The apparatus as claimed in claim 3, wherein a minimum level detector is arranged at a bottom of the packaging bottle and close to the liquid level indicating cavity, the minimum level detector outputs alerting signals to the processor when the minimum level detector detects that the floating ball has moved to a minimum level position.

6. The apparatus as claimed in claim 1, wherein the wok lid controlling assembly comprises
a base, fixed onto the machine frame,
a linear motor, mounted to the base,
a connecting rod,
a wok lid holder,
a bearing, and
an elastic component,
wherein the linear motor comprises a stator fixed to the base and a rotor moving up and down relative to the stator, the connecting rod connects the rotor and the wok lid holder; the wok lid holder is provided with a through hole for the hollow shaft to run through, a lower end of the hollow shaft is fixedly connected to the wok lid, while an upper end of the hollow shaft protrudes through the through hole; the wok lid holder is provided with a groove for receiving the bearing, the hollow shaft is slidingly engaged with the bearing, the hollow shaft is provided at the upper end thereof with a stopping ring engaging with the bearing to prevent the hollow shaft from sliding out from the wok lid holder when sliding relative to the bearing; an upper end of the elastic component is connected to the bearing, and a lower end of the elastic component is connected to the wok lid; the linear motor is connected to the processor of the cooking machine to receive a command issued by the processor on the basis of the preset recipe program and react accordingly to the command, so as to control the wok lid to cover/uncover the wok.

7. The apparatus as claimed in claim 6, wherein
when receiving a close-lid command, the linear motor drives the rotor to move downwards so as to further drive the wok lid holder and the hollow shaft to move downwards; after the wok lid has contacted an opening of the wok, the linear motor drives the rotor to continue moving downwards, so that the wok lid holder and the bearing both slide downwards relative to the hollow shaft to press the elastic component until the opening of the wok is tightly sealed by the wok lid;

when receiving an open-lid command, the linear motor drives the rotor to move upwards so as to further drive the wok lid holder and the hollow shaft to move upwards, so that the wok lid is lifted up away from the opening of the wok.

8. The apparatus as claimed in claim 7, wherein the bearing comprises an inner ring, an outer ring and rolling elements provided therebetween, the hollow shaft is rollingly engaged with the inner ring, the inner ring is connected to the upper end of the elastic component; when the wok that is tightly sealed by the wok lid rotates under the control of a rotating device, the wok lid, the hollow shaft, the elastic component and the inner ring all rotate synchronously with the wok.

9. The apparatus as claimed in claimed 8, wherein the preset output pipe comprises an output hose and a guide tube, one end of the output hose is connected to the output end of each of the plurality of peristaltic pumps, the other end of the output hose is connected to the guide tube; the guide tube is received inside the hollow shaft via a guide-tube frame, the guide-tube frame is rollingly engaged with the hollow shaft and the guide tube remains stationary while the hollow shaft rotates.

10. The apparatus as claimed in claim 6, wherein the base is provided with two position controlling detectors, a first position controlling detector and a second position controlling detector, to detect if the wok lid tightly seals an opening of the wok or is away from the opening of the wok and then send detection results to the processor, the first position controlling detector is mounted at a position in which the first position controlling detector faces a bottom of the wok lid holder when the wok lid is in its initial position, and the second position controlling detector is mounted at another position in which the second position controlling detector faces the bottom of the wok lid holder when the wok lid tightly seals the opening of the wok.

* * * * *